United States Patent
Sankaranarasimhan et al.

(10) Patent No.: US 9,946,529 B2
(45) Date of Patent: Apr. 17, 2018

(54) FUNCTION-BASED DYNAMIC APPLICATION EXTENSION FRAMEWORK

(71) Applicant: Samsung Electronics Co., Ltd., Suwon-si, Gyeonggi-do (KR)

(72) Inventors: Manikandan Sankaranarasimhan, Fremont, CA (US); Kalyan Desineni, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/834,373

(22) Filed: Aug. 24, 2015

(65) Prior Publication Data

US 2016/0321040 A1    Nov. 3, 2016

Related U.S. Application Data

(60) Provisional application No. 62/156,175, filed on May 1, 2015.

(51) Int. Cl.
*G06F 9/44* (2006.01)
*G06F 9/445* (2018.01)
(Continued)

(52) U.S. Cl.
CPC .............. *G06F 8/61* (2013.01); *G06F 3/0484* (2013.01); *G06F 8/34* (2013.01); *G06F 8/36* (2013.01);
(Continued)

(58) Field of Classification Search
None
See application file for complete search history.

(56) References Cited

U.S. PATENT DOCUMENTS 8,612,933 B1    12/2013    Gill et al.
8,930,940 B2    1/2015    Xu et al.
(Continued)

FOREIGN PATENT DOCUMENTS

WO    WO-2013059605 A1    4/2013

OTHER PUBLICATIONS

U.S. Appl. No. 14/980,204, filed Dec. 28, 2015, Sankaranarasimhan et al.
(Continued)

*Primary Examiner* — Qamrun Nahar
(74) *Attorney, Agent, or Firm* — Jefferson IP Law, LLP

(57) ABSTRACT

A method of developing a first application includes accessing a graphical user interface of a developer exchange system. The method includes, using the graphical user interface of the developer exchange system, selecting a first function from a plurality of functions in a function ontology. The method includes receiving, from the developer exchange system, processor-executable instructions for integration into the first application. The processor-executable instructions include (i) sending a function module request to the developer exchange system, (ii) receiving a function module provided by the developer exchange system, (iii) executing the provided function module, and (iv) presenting display data from the provided function module within the first application. The function module request identifies the first function. The method includes integrating the processor-executable instructions into the first application, including designating an area in which to display the display data to a user of the first application.

19 Claims, 18 Drawing Sheets

(51) Int. Cl.
  *G06F 3/0484* (2013.01)
  *G06F 17/30* (2006.01)
  *H04L 29/08* (2006.01)
  *H04W 4/02* (2018.01)
(52) U.S. Cl.
  CPC .......... *G06F 8/65* (2013.01); *G06F 17/30864* (2013.01); *H04L 67/34* (2013.01); *H04W 4/02* (2013.01)

(56) References Cited

U.S. PATENT DOCUMENTS

| | | | |
|---|---|---|---|
| 9,491,229 | B1 | 11/2016 | Lachwani et al. |
| 2004/0054690 | A1 | 3/2004 | Hillerbrand et al. |
| 2008/0209503 | A1 | 8/2008 | Hess et al. |
| 2009/0254912 | A1 | 10/2009 | Roundtree et al. |
| 2011/0314004 | A1 | 12/2011 | Mehta |
| 2012/0233567 | A1* | 9/2012 | Brown .................... G06F 9/445 715/810 |
| 2012/0254825 | A1* | 10/2012 | Sharma .................... G06F 8/34 717/101 |
| 2012/0323898 | A1 | 12/2012 | Kumar et al. |
| 2013/0019239 | A1 | 1/2013 | Fontignie et al. |
| 2013/0132896 | A1 | 5/2013 | Lee et al. |
| 2013/0304729 | A1 | 11/2013 | Jiang et al. |
| 2013/0305218 | A1 | 11/2013 | Hirsch et al. |
| 2013/0339345 | A1 | 12/2013 | Soto Matamala et al. |
| 2014/0129265 | A1 | 5/2014 | Arena et al. |
| 2014/0282358 | A1 | 9/2014 | Mowatt et al. |
| 2015/0242510 | A1 | 8/2015 | Shapira |
| 2015/0347617 | A1 | 12/2015 | Weinig et al. |
| 2016/0321059 | A1 | 11/2016 | Sankaranarasimhan et al. |
| 2016/0321060 | A1 | 11/2016 | Sankaranarasimhan et al. |
| 2016/0321064 | A1 | 11/2016 | Sankaranarasimhan et al. |
| 2017/0185384 | A1 | 6/2017 | Sankaranarasimhan et al. |
| 2017/0187838 | A1 | 6/2017 | Sankaranarasimhan et al. |
| 2017/0206122 | A1 | 7/2017 | Maltese et al. |

OTHER PUBLICATIONS

U.S. Appl. No. 15/246,062, filed Aug. 24, 2016, Sankaranarasimhan et al.
PCT International Search Report and Written Opinion dated Oct. 4, 2016 for PCT/IB2016/052464, 17 pages.

* cited by examiner

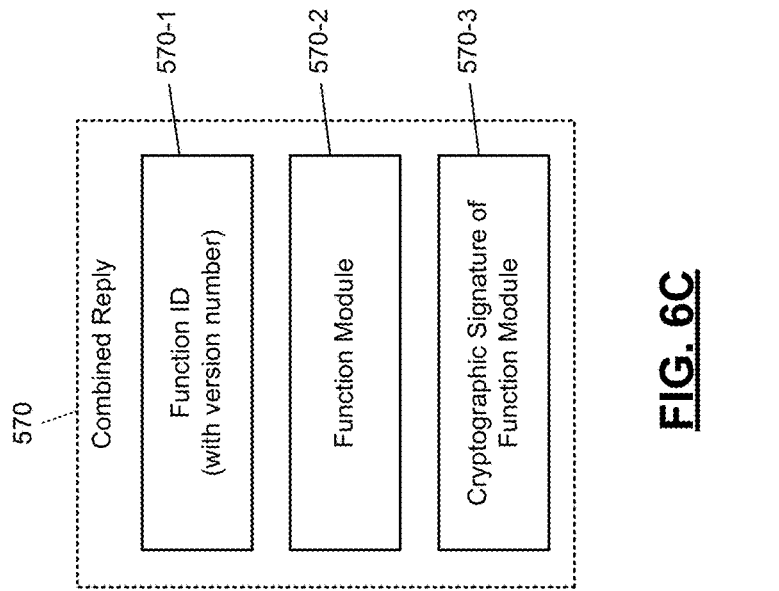
FIG. 6A
FIG. 6B
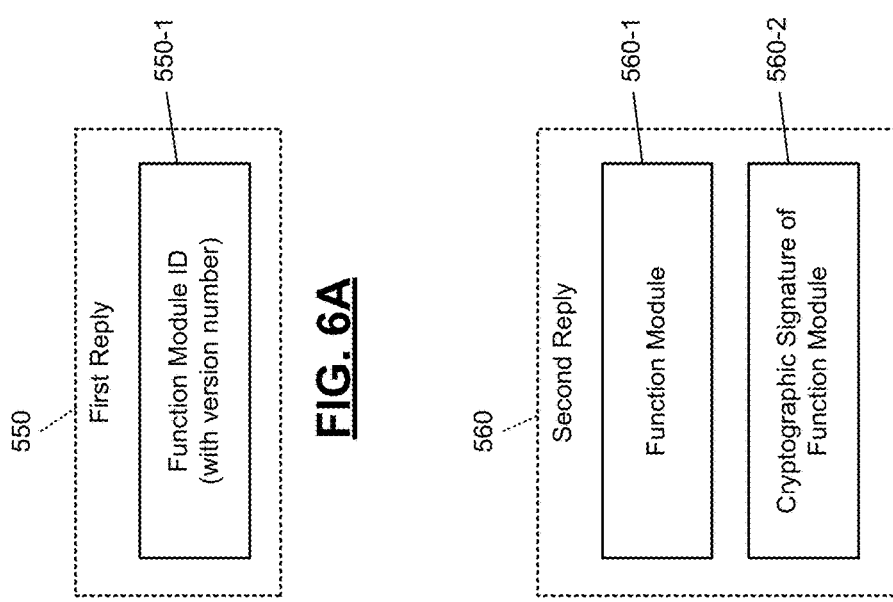
FIG. 6C

FUNCTION-BASED DYNAMIC APPLICATION EXTENSION FRAMEWORK

CROSS-REFERENCE TO RELATED APPLICATIONS

This application claims the benefit of U.S. Provisional Application No. 62/156,175, filed on May 1, 2015. The entire disclosure of the application referenced above is incorporated herein by reference.

FIELD

The present disclosure relates to application development and more particularly to systems and methods for collaborative application development for mobile devices.

BACKGROUND

In recent years, the use of Internet-connected devices such as smartphones has grown exponentially. The number and variety of available software applications for such devices has similarly grown by orders of magnitude. Presently, many diverse functions can be performed and many diverse sets of data can be analyzed on any given Internet-connected device. The applications that offer this functionality and data span business-oriented applications, educational applications, games, new applications, shopping applications, messaging applications, media streaming applications, social media applications, etc.

With such a wide array of available applications, many users of Internet-connected devices are not aware of the availability of applications that may perform functions and/or provide data of interest to the users. Even app developers, who generally focus on one segment of the market for applications, are unable to keep up to date on all of the applications that their users might find valuable in other segments. Further, no developer can expertly implement even a fraction of the spectrum of functionality available across the application ecosystem.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A developer exchange system includes a data store configured to store records, each record including a function module and metadata describing the function module. The metadata specifies a function performed by the function module. A plurality of functions is arranged within a function ontology. The developer exchange system includes a function management module configured to provide a graphical user interface to a first application developer for selection of a first function from the function ontology. The developer exchange system includes an integration module configured to provide processor-executable instructions to the first application developer for integration into a first application. The processor-executable instructions include (i) sending a function module request to the developer exchange system, (ii) receiving a function module provided by the developer exchange system, (iii) executing the provided function module, and (iv) presenting display data from the provided function module within the first application. The function module request identifies the first function. The developer exchange system includes a delivery module configured to (i) receive a function module request from a user device, the function module request specifying an identifier of a desired function (ii) identify a consideration set of the records from the data store that correspond to the desired function, (iii) select one record of the consideration set of the records, and (iv) selectively transmit the function module corresponding to the selected record from the data store to the user device.

In other features, the developer exchange system includes a producer module configured to (i) receive a function module from a second application developer and (ii) create a new record in the data store to store the function module received from the second application developer. In other features, the producer module is configured to update the new record in the data store in response to receiving an updated function module from the second application developer. In other features, the producer module is configured to store metadata from the second application developer in the new record. The metadata includes at least one of (i) a preview of a user interface of the function module received from the second application developer and (ii) a text description of the function module received from the second application developer.

In other features, the processor-executable instructions include storing provided function modules in a function module data store. In other features, the delivery module is configured to transmit an identifier of the function module to the user device in response to receiving the function module request from the user device. The processor-executable instructions include receiving a function module identifier from the developer exchange system and, only in response to the received function module identifier not matching a function module identifier stored in the function module data store, sending a request to the developer exchange system for provision of a function module identified by the received function module identifier.

In other features, the processor-executable instructions include executing the provided function module in a sandbox. In other features, the processor-executable instructions include, on startup of the first application, sending the function module request to the developer exchange system. In other features, the processor-executable instructions include, on only a first startup of the first application on the user device, sending the function module request to the developer exchange system. In other features, the display data is provided to states of the first application corresponding to a first state template. The processor-executable instructions include, in response to a state being instantiated from the first state template, sending the function module request to the developer exchange system.

In other features, the processor-executable instructions include storing the provided function module provided by the developer exchange system. in response to a subsequent function module request with respect to the first state template causing the developer exchange system to provide a different, second function module, purging the provided function module from storage. In other features, the processor-executable instructions include an identification of the first function. In other features, the function module request identifies a source of the function module request. The delivery module is configured to recognize the desired function based on the source of the function module request.

In other features, the integration module is configured to provide an identification of the first function to the first application developer. The processor-executable instructions include receiving the identification of the first function from an application programming interface call inserted by the first application developer. In other features, the integration module is configured to provide a software development kit to the first application developer. The software development kit assists the first application developer in preparing the application programming interface call.

In other features, the processor-executable instructions include identifying applications installed on the user device and preparing the function module request by including data related to the identified applications. The delivery module is configured to limit the consideration set of the records according to the data related to the identified applications. In other features, the processor-executable instructions include identifying active accounts on the user device and preparing the function module request by including data related to the active accounts. The delivery module is configured to (i) adjust scores of the consideration set of the records according to the data related to the active accounts and (ii) select the selected record according to the adjusted scores.

A method of operating a developer exchange system includes defining a function ontology encompassing a plurality of functions. The method includes storing records in a data store, each record including a function module and metadata describing the function module. The metadata specifies a function performed by the function module chosen from the function ontology. The method includes creating and presenting a graphical user interface to a first application developer for selection of a first function from the function ontology. The method includes, in response to the selection of the first function, transmitting processor-executable instructions to the first application developer for integration into a first application. The processor-executable instructions include (i) sending a function module request to the developer exchange system, (ii) receiving a function module provided by the developer exchange system, (iii) executing the provided function module, and (iv) presenting display data from the provided function module within the first application. The function module request identifies the first function.

In other features, the method includes receiving a first function module from a second application developer. The method includes, in response to receiving the first function module, creating a new record in the data store to store the first function module. In other features, the method includes receiving an updated version of the first function module from the second application developer. The method includes updating the new record in the data store in response to receiving the updated version of the first function module.

In other features, the new record stores metadata from the second application developer. The metadata includes at least one of (i) a preview of a user interface of the function module received from the second application developer and (ii) a text description of the function module received from the second application developer. In other features, the method includes receiving a function module request from a user device, the function module request specifying an identifier of a desired function. The method includes identifying a consideration set of the records from the data store that correspond to the desired function. The method includes selecting one record of the consideration set of the records. The method includes selectively retrieving the function module corresponding to the selected record from the data store and transmitting the retrieved function module to the user device.

In other features, the processor-executable instructions include storing provided function modules in a function module data store. In other features, the method includes, in response to receiving the function module request from the user device, transmitting an identifier of the function module to the user device. The processor-executable instructions include receiving a function module identifier from the developer exchange system and, only in response to the received function module identifier not matching a function module identifier stored in the function module data store, sending a request to the developer exchange system for provision of a function module identified by the received function module identifier.

In other features, the method includes recognizing the desired function based on an identity of an application from where the function module request originated. In other features, the processor-executable instructions include executing the provided function module in a sandbox. In other features, the processor-executable instructions include, on startup of the first application, sending the function module request to the developer exchange system. In other features, the processor-executable instructions include, on only a first startup of the first application on a user device, sending the function module request to the developer exchange system.

In other features, the processor-executable instructions include, in response to a state being instantiated from a first state template, sending the function module request to the developer exchange system. The display data is provided to states of the first application corresponding to the first state template. In other features, the processor-executable instructions include storing the provided function module provided by the developer exchange system. The instructions include, in response to a subsequent function module request with respect to the first state template causing the developer exchange system to provide a different, second function module, purging the provided function module from storage.

In other features, the processor-executable instructions include an identification of the first function. In other features, the method includes providing an identification of the first function to the first application developer. The processor-executable instructions include receiving the identification of the first function from an application programming interface call inserted into the first application by the first application developer.

In other features, the method includes providing a software development kit to the first application developer. The software development kit provides the first application developer with a template for creating the application programming interface call. The template is populated with the identification of the first function. In other features, the processor-executable instructions include identifying applications installed on a user device on which the first application is executing. The instructions include identifying active accounts on the user device. The instructions include preparing the function module request by including data related to the active accounts and data related to the identified applications.

A method of developing a first application includes accessing a graphical user interface of a developer exchange system. The method includes using the graphical user interface of the developer exchange system, selecting a first function from a plurality of functions in a function ontology. The method includes receiving, from the developer exchange system, processor-executable instructions for integration into the first application. The processor-executable instructions include (i) sending a function module request to the developer exchange system, (ii) receiving a function module provided by the developer exchange system, (iii) executing the provided function module, and (iv) presenting display data from the provided function module within the first application. The function module request identifies the first function. The method includes integrating the processor-executable instructions into the first application, including designating an area in which to display the display data to a user.

In other features, the processor-executable instructions include storing received function modules in a function module data store. In other features, the processor-executable instructions include receiving a function module identifier from the developer exchange system in response to the function module request. The instructions include, only in response to the received function module identifier not matching a function module identifier stored in the function module data store, sending a request to the developer exchange system for provision of a function module identified by the received function module identifier.

In other features, the processor-executable instructions include executing the provided function module in a sandbox. In other features, the processor-executable instructions include, on startup of the first application, sending the function module request to the developer exchange system. In other features, the processor-executable instructions include, on only a first startup of the first application on a user device, sending the function module request to the developer exchange system. In other features, the method includes integrating the display data into a first state template, including reserving an area in the first state template for display of the display data from the function module. The method includes, in response to instantiation of a state from the first state template, the function module is invoked and the display data generated by the function module is displayed in the reserved area.

In other features, the processor-executable instructions include, in response to instantiation of the state from the first state template, sending the function module request to the developer exchange system. In other features, the processor-executable instructions include storing the provided function module provided by the developer exchange system. The instructions include sending a function module request to the developer exchange system each time a state is instantiated from the first state template. The instructions include, in response to a subsequent function module request with respect to the first state template causing the developer exchange system to provide a different, second function module, purging the provided function module from storage.

In other features, the method includes receiving, from the developer exchange system, an identification of the first function. The method includes creating an application programming interface call within code associated with the first state template. The application programming interface call includes the identification of the first function. In other features, the method includes receiving a software development kit from the developer exchange system. The software development kit provides a template for creating the application programming interface call. Creating the application programming interface call includes populating the template with the identification of the first function.

In other features, the processor-executable instructions include identifying applications installed on a user device, identifying active accounts on the user device, and preparing the function module request by including data related to the active accounts and data related to the identified applications. In other features, the method includes creating a first function module having a proper subset of functionality of the first application. The method includes providing the first function module to the developer exchange system.

In other features, the method includes, in response to updating code of the first application related to the proper subset of functionality, an updated version of the first function module to the developer exchange system. In other features, the method includes providing metadata regarding the first function module to the developer exchange system. The metadata includes at least one of (i) a preview of a user interface of the first function module and (ii) a text description of the first function module.

A non-transitory computer-readable medium stores processor-executable instructions. The instructions include transmitting a function module request to a developer exchange system over a network connection. The function module request identifies a specific function to be performed. The instructions include receiving a first function module from the developer exchange system. The first function module includes code configured to generate display data related to the specific function to be performed. The instructions include storing the first function module in a function module data store. The instructions include, in response to a triggering event, retrieving the first function module from the function module data store and executing the first function module. The instructions include presenting display data generated by execution of the first function module.

In other features, the first function module is executed in a sandbox. In other features, the display data is displayed within a first state of an application within which the instructions are incorporated. The triggering event includes the first state of the application being accessed by a user of the application. In other features, the display data is incorporated into a first state template of a first application from which states are instantiated. The triggering event is based on a state being instantiated from the first state template.

In other features, the function module request is transmitted in response to a state being instantiated from the first state template. The instructions include transmitting a second function module request to the developer exchange system in response to another instance of a state being instantiated from the first state template. The instructions include, in response to receiving a different, second function module from the developer exchange system according to the second function module request, deleting the first function module from the function module data store.

In other features, the instructions include receiving a function module identifier from the developer exchange system in response to the function module request. The instructions include, only in response to the received function module identifier not matching a function module identifier stored in the function module data store, sending a request to the developer exchange system for provision of the first function module.

In other features, the instructions include identifying applications installed on a device within which the instructions are stored, identifying active accounts on the device, and preparing the function module request by including data related to the active accounts and data related to the identified applications. A computing device includes the non-transitory computer-readable medium and processing hardware that executes the instructions from the non-transitory computer-readable medium. In other features, the computing device is a smartphone.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

FIGS. 6A-6C depict example contents of replies returned in response to a function request.

In the drawings, reference numbers may be reused to identify similar and/or identical elements.

DETAILED DESCRIPTION

Figure 1:
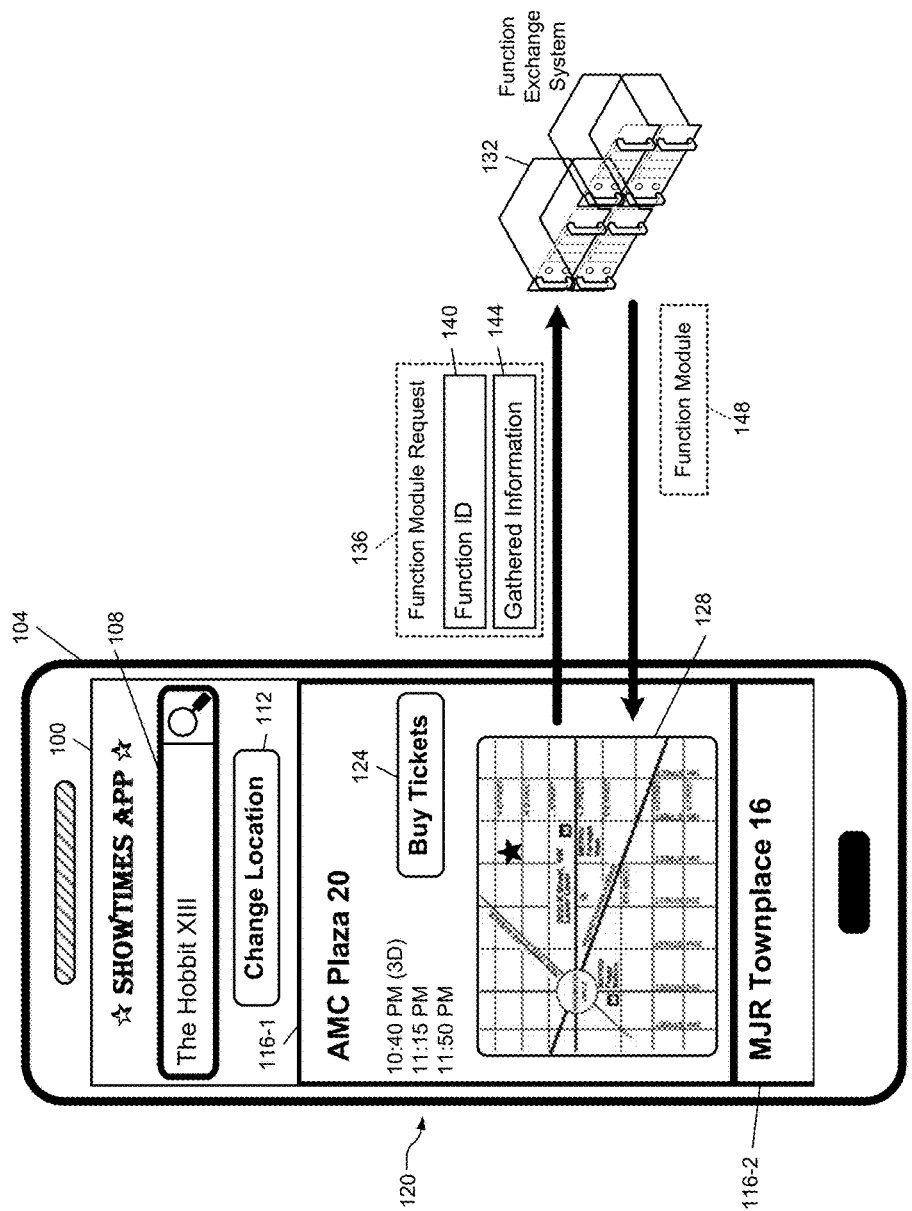
FIG. 1 is a combined functional block diagram and graphical user interface example according to the principles of the present disclosure.

A developer of an application (referred to interchangeably here as an app) generally focuses on providing a good user experience for a limited number of functions. For example, an app developer may focus on providing accurate and intuitively-presented movie showtimes, but may not invest effort in providing other related functionality, such as maps or navigation directions to movie theaters. Note that the functions provided by an app may also be described as actions that the app can perform.

An app developer would generally prefer to keep a user within their own app, both to increase engagement with the app and to provide the most seamless user experience. However, attempting to replicate a function from another app may not provide a better user experience when that other function is not the developer's core strength. For example, if the developer is skilled at presenting movie showtimes and possesses valuable data and processing algorithms related to showtimes, the developer likely is not an expert in GPS-based mapping software development. As a result, that developer should rely on others to provide mapping functions.

In order to access the functionality of another app, a developer may hardcode a reference to that other app when writing their code. In some circumstances, it is quite likely that a certain app would be available on an operating system. For example, a developer may reasonably expect that GOOGLE MAPS mapping software will be available on a smartphone running the ANDROID operating system, although there are notable exceptions to this general rule, especially outside of the United States.

However, even when an app is installed, a user may prefer to use a different app. For most other categories of apps, such as movie review apps or restaurant review apps, there is no guarantee that any particular app will be present. Therefore, hardcoding access to one or more specific apps is an exercise in guesswork. Also, the constant evolution of the app ecosystem means that the most popular, the most widely installed, and the most useful apps in any category may be different and may change with time.

For certain functions, a request may be passed to the operating system. For example, to map a location, a mapping request can be passed to the operating system. The operating system may present the user with a list of installed apps to service that mapping request. The operating system may allow the user to choose one of the apps as a default and, once the default is selected, the average user may never revisit that choice. Certain operating systems may not present a choice for certain requests, instead passing the request to a default app or service unless a specific configuration change is made by the user.

The ability of an app developer to integrate with other apps that would provide valuable functionality to users is limited and difficult to implement. There is also no systematic way for developers to enter business relationships with each other. The present disclosure describes a function exchange system in which a developer can act as a producing developer and provide function code related to a particular function to the function exchange system, and a developer acting as a consuming developer can integrate that function code into their own application.

This integration may be performed during development, such as when a movie showtimes app developer integrates function code for mapping from a producing developer. In other implementations, the showtimes app may request the mapping function code from the function exchange system dynamically, such as when the app is first executed on the user device or at periodic intervals. In various implementations, the function code is requested from the function exchange system when a screen (also known as a state) of the showtimes app where the mapping functionality will be relevant is displayed to a user.

If the function code from the producing developer is updated, the consuming developer app may update stored copies of the function code. This update may be performed in a pull configuration, where the consuming app periodically checks with the function exchange system to see if updates are available. In other implementations, the function exchange system may push updates out to apps. In another example, a consuming app may subscribe to updates from the function exchange system when the consuming app first downloads the function code.

The function code provided by the producing developer, which will be referred to below as a function module, may take a variety of forms. For example, the function module may be specific to a certain entity. In other words, the function module provided may perform the function for a single entity. For example, a producing developer of mapping software may provide function modules, one for each possible location to be mapped. The consuming developer would specify which function module was desired based on the location of interest.

For example, a movie showtimes developer may select a function module from the mapping software producing developer specific to the location of a movie theater. The consuming developer would then select a function module for each of the other movie theaters covered by the movie showtimes app. In other implementations, the function may be generic to entity. In other words, the producing developer of mapping software may provide a function module to the function exchange system that allows for any location to be mapped, or at least the most popular locations within a certain geography (such as the continental United States).

The function module itself may include software code of varying levels of complexity or may simply include static data. For example, a function module for a specific location may include an image of a map encompassing that location. Selection by the user of the image may link the user to another app that will provide interactive mapping for the user. The image may be supplemented and/or replaced by text information, such as the name of the app, information about the popularity of the app, etc.

The resulting preview may be described as a deep view card, and is associated with a deep link to another app that can provide further interaction, such as by providing an interactive map display, navigation directions, etc. A deep link means that the user is taken directly to the desired location within the mapping application, as opposed to being taken to a default state of the mapping application.

A deep view card for an application or a state of an application shows additional information, not just the identification of the application or application state. For example, the information may include a title of the application state or a description of the application state, which may be a snippet of text from the application state. Other metadata may be provided from the application state, including images, location, number of reviews, average review, and status indicators. For example, a status indicator of "open now" or "closed" may be applied to a business depending on whether the current time is within the operating hours of the business.

Some deep view cards may emphasize information that led to the deep view card being selected as a search result. For example, text within the deep view card that matches a user's query may be shown in bold or italics. The deep view card may also incorporate elements that allow direct actions, such as the ability to immediately call an establishment or to transition directly to a mapping application to get navigation directions to the establishment. Other interactions with the deep view card (such as tapping or clicking any other area of the deep view card) may take the user to the indicated state or application. As described in more detail below, this may be accomplished by opening the relevant app or, if the app is not installed, opening a website related to the desired application state. In other implementations, an app that is not installed may be downloaded, installed, and then executed in order to reach the desired application state.

In other words, a deep view card includes an indication of the application or state as well as additional content from the application or state itself. The additional content allows the user to make a more informed choice about which result to choose, and may even allow the user to directly perform an action without having to navigate to the application state. If the action the user wants to take is to obtain information, in some circumstances the deep view card itself may provide the necessary information.

The function module may include multiple images for use in deep view cards of different sizes. The consuming developer may reserve a certain section of a state for the deep view card, and the different sizes allow the image to be tailored specifically to the desired size. The function module may include code for creating the deep view cards, which may include selecting an image of an appropriate size and/or scaling images.

The function module may also include deep view creation code that creates the preview image. For example, the deep view creation code may query an app on the device or a server to generate an image showing the location of interest. The deep view creation code may also generate the deep link that will be followed upon selection of the deep view card by the user. The deep view creation code may receive information, such as a location, from the code written by the consuming developer.

Continuing the mapping example, the deep view creation code requests mapping data and/or an image of mapping data from a source related to the producing developer. This source may be an app of the producing developer that is installed on the user device or may be a server system operated by the producing developer.

For example, the consuming developer may integrate a function module from a mapping vendor that is entity-generic. When a state for a movie theater is shown to the user, the consuming app passes the movie theater location to the function module. The function module queries a mapping server of the producing developer and creates a deep view card. The deep view card includes, as one example, a preview image of the movie theater location within a map, and a deep link to the movie theater's location within the producing developer's app.

A deep link may include a programming call that opens the producing developer's app to a specific state. The deep link may include a uniform resource locator (URL) to a web edition of the producing developer's app. The deep link may include a script that opens the producing developer's app to a default state and then navigates to the desired state. The URL may be used in situations where the producing developer's app is not installed on the user device.

In some implementations, some or all of the function modules may include code that not only presents a deep view card but also provides additional functionality when the deep view card is selected. For example, a producing developer of a mapping application may generate a function module that includes all the code necessary to provide an interactive map. This function module can then, without linking out to other apps, provide an interactive map within the consuming developer's app. The function module therefore may include code for creating a deep view card, for identifying location based on GPS and Wi-Fi signals, and code for retrieving map data from a mapping server.

The function module may also include code for implementing a user interface that allows the user to interact with the map. The user interface created by the function module may be a separate state that is opened when the user selects the deep view card of the map. In some implementations, the function module may allow the image of the map in the deep view card itself to be manipulated, without transitioning to another state.

When the consuming developer is developing an app (referred to as a first app), the consuming developer may obtain a function module from the function exchange system from a specific producing developer. For example, the consuming developer may identify a mapping function module from NOKIA Corp. using the function exchange system.

In other implementations, the consuming developer may select a specific function from an ontology (see FIG. 2 for an example) established by the function exchange system. In other words, the consuming developer may select the function corresponding to "showing an interactive map of a location."

When the first app is executed on the user device, the first app may query the function exchange system, asking for a function module that presents an interactive map of a location. The function exchange system, based on data about the user device and data about the various function modules that implement the requested functionality, provides a function module back to the first app. The first app executes the function module, such as within a sandbox implemented by code from the function exchange system. The sandbox may significantly limit the function module's interaction with the user device, such as by constraining access to hardware resources of the user device, other applications, and any memory outside of a predefined range.

The first app can therefore provide the desired functionality without a hardcoded reference to the function module of any specific app developer. The first app may query the function exchange system to see if a new function module or a new version of an existing function module is recommended each time the downloaded function module is executed. In other implementations, the first app may only query the function exchange system after a predetermined period of time, such as 24 hours, has elapsed since the previous query.

The function exchange system may provide the consuming developer with code required for dynamically retrieving, updating, and executing function modules. This code is integrated into the first app during development. The code provided by the function exchange system may be offered as a library or package, and may be included as part of a software development kit (SDK). Identification by the consuming developer of what function is desired may be performed using the SDK or may be specified using a web portal of the function exchange system.

In FIG. 1, an unsophisticated showtimes app 100 is shown running on a user device 104, such as a smartphone. A search bar 108 allows the user to search for a specific movie (in this case, a fictional "The Hobbit XIII"). The showtimes app 100 may show theaters around the present location of the user device 104 or may allow the user to specify location using a "change location" button 112.

Results are shown, including an AMC Plaza 20 movie theater result 116-1 and an MJR Townplace 16 movie theater result 116-2. The result 116-1 includes movie times 120, a "buy tickets" button 124, and a deep view card 128 showing an example map of the location of the theater, with the theater indicated by a star.

The showtimes app 100 includes code from a function exchange system 132 that operates in response to a state (or, screen) of the showtimes app 100 being activated. The code sends a function module request 136 to the function exchange system 132. The function module request 136 specifies a function ID 140 to indicate to the function exchange system 132 what function is desired. In this case, the desired function is showing the map of a location. The function module request 136 may also include gathered information 144, such as which mapping applications are installed on the user device 104.

The function exchange system 132 responds with a function module 148. The function module 148 allows the showtimes app 100 to display the map of the deep view card 128. As described above, the function module 148 may include the image that is shown in the deep view card 128 or may include code that allows the image to be retrieved and/or generated. If the function module is entity-specific, another function module may be retrieved from the function exchange system 132 for the result 116-2.

Figure 2:
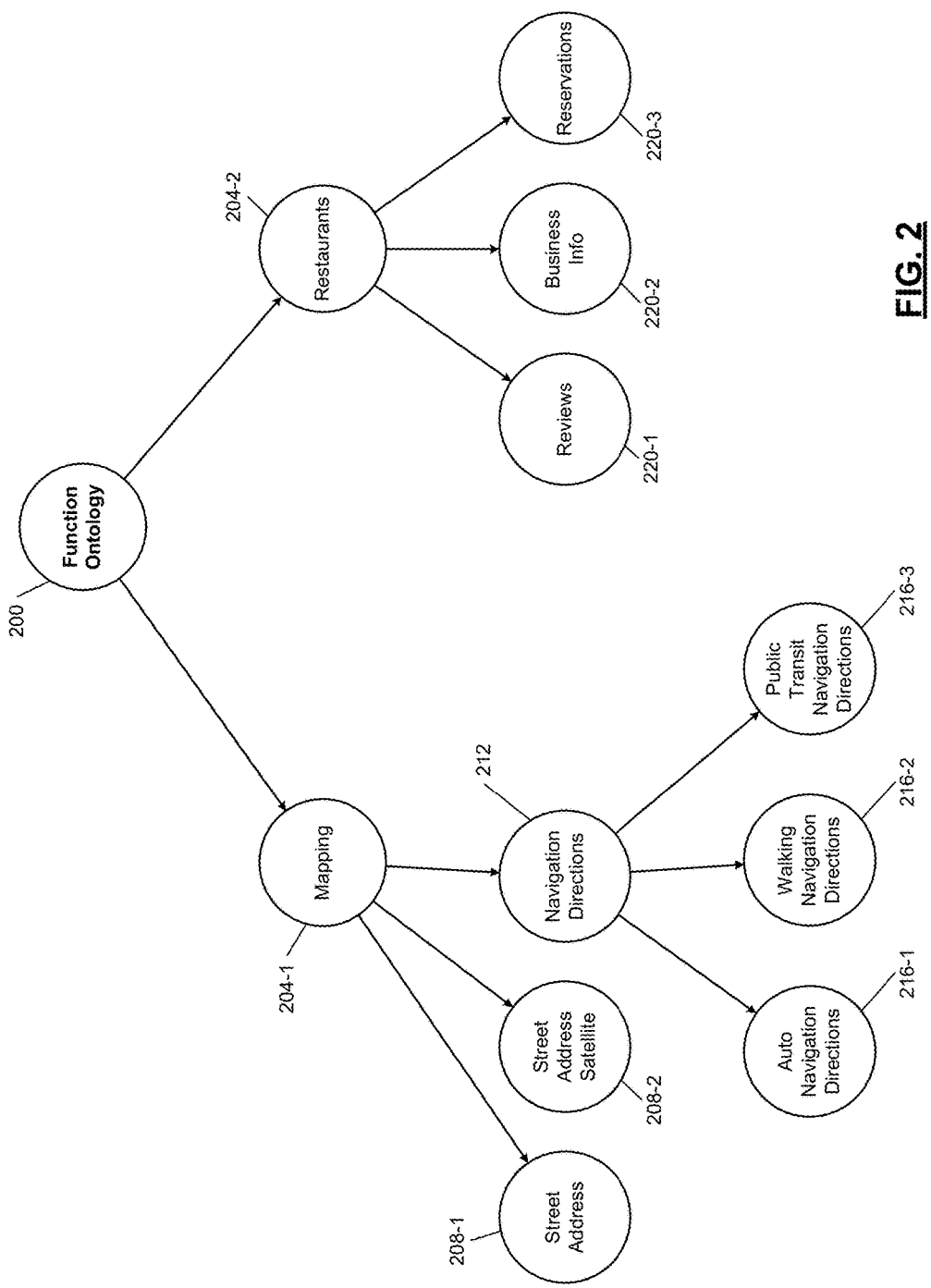
FIG. 2 is a graphical representation of an example function ontology.

In FIG. 2, a function ontology 200 developed by an operator of the function exchange system 132 includes a number of branch nodes (such as mapping 204-1 and restaurants 204-2), which may represent different industry verticals. The function ontology 200 includes leaf nodes such as street address mapping 208-1 and street address with satellite imagery 208-2 underneath the mapping branch node 204-1.

Each of the leaf nodes corresponds to a particular function offered by one or more apps. A navigation directions branch node 212 underneath the mapping branch node 204-1 encompasses leaf nodes for auto navigation directions 216-1, walking navigation directions 216-2, and public transit navigation directions 216-3. The function ontology 200 also includes leaf nodes for reviews 220-1, business information 220-2, and reservations 220-3 underneath the restaurants branch node 204-2.

The function ontology 200 may be arranged in a wide variety of ways and may be divided at varying levels of granularity. For example, the leaf nodes 208-1 and 208-2 may be combined under a common street address branch node, where leaf node 208-1 would simply specify no satellite imagery while leaf node 208-2 would specify the presence of satellite imagery.

Decisions on how to structure the function ontology 200 may be made by operators of the function exchange system 132 based on, for example, how many apps perform each function. If a leaf node exists that specifies a function only performed by one app, that leaf node may be combined with other leaf nodes so that a selection of applications is available.

When a consuming developer specifies a function of interest for their app, the function may be specified as a leaf node corresponding to a specific function or as a branch node corresponding to a variety of functions. For example, the consuming developer may specify mapping (branch node 204-1) as the desired function if the specific mapping function provided by the function module is not important. However, if the consuming developer requires that public transit be encompassed by the function module, the consuming developer would specify the leaf node 216-3 for public transit navigation directions.

Figure 3:
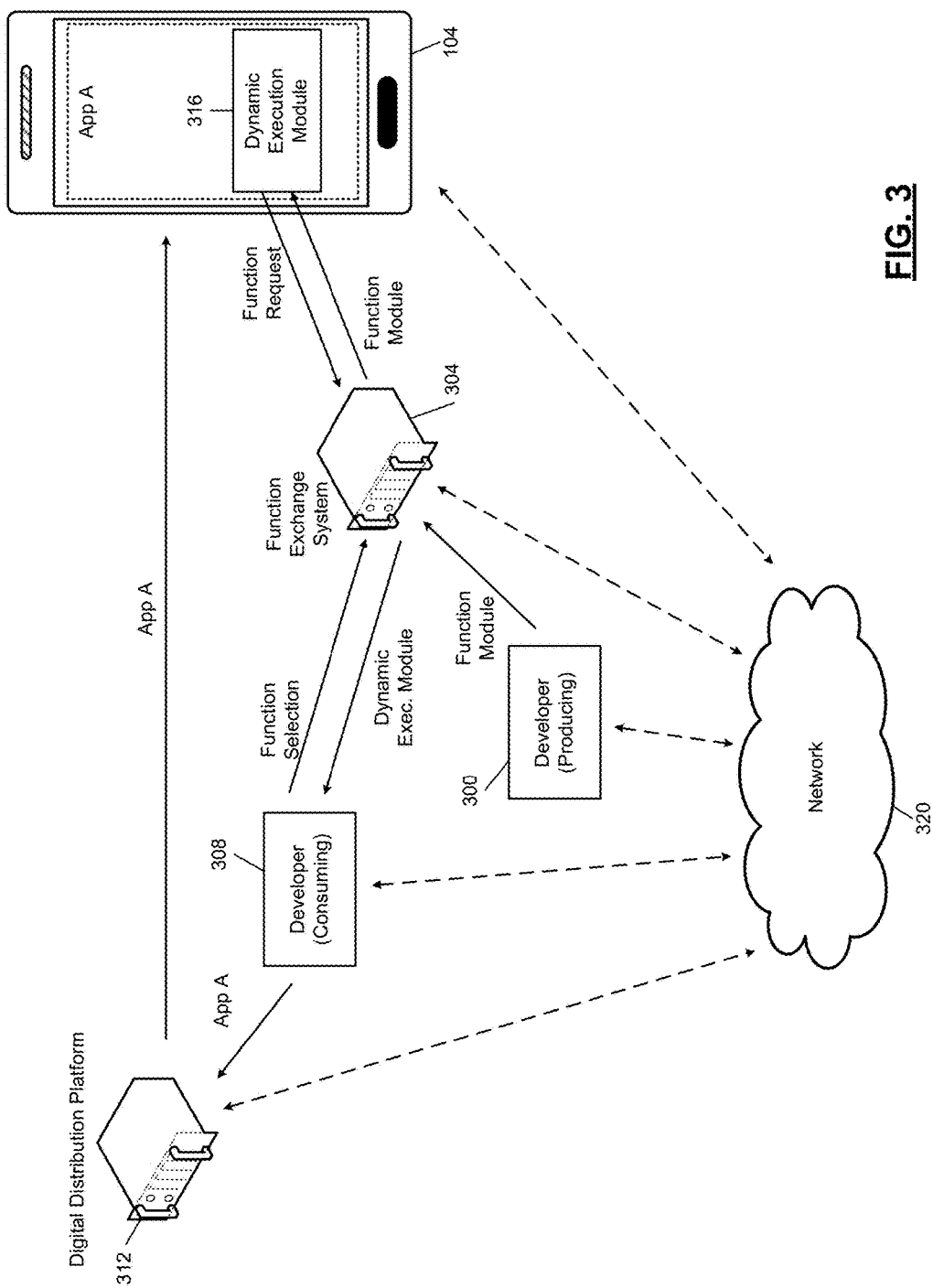
FIG. 3 is a high-level functional block diagram demonstrating how the principles of the present disclosure can be used in a mobile application ecosystem.

In FIG. 3, a high-level overview of an overall app ecosystem is shown. A producing developer 300 provides one or more function modules to a function exchange system 304. A consuming developer 308 interacts with a function exchange system 304 to specify a selected function. An app developer may operate both in a producing role as the producing developer 300 as well as in a consuming role as the consuming developer 308.

The function exchange system 304 may provide one or more function modules to the consuming developer 308. In other implementations, the function exchange system may provide a dynamic execution module to the consuming developer 308. The dynamic execution module will allow an app developed by the consuming developer 308 to retrieve function modules from the function exchange system 304.

The consuming developer 308 incorporates the dynamic execution module or specific function modules into an application under development (referred to in FIG. 3 as "App A"). App A is provided to a digital distribution platform 312, such as the PLAY digital distribution platform by Google Inc. or the APP STORE digital distribution platform by Apple Inc.

A user of a user device 104 downloads App A from the digital distribution platform 312. Upon executing App A on the user device, a dynamic execution module 316 within App A makes a function request to the function exchange system 304, and receives a function module from the function exchange system 304.

As described above, the dynamic execution module 316 may be activated only once a state for which the function module is required is presented to the user device 104. In other implementations, the dynamic execution module 316 may make the function request each time the app is started up. In this way, download of the function module may be performed in the background so there is no wait when the corresponding state is displayed to the user.

Although FIG. 3 shows the effective flow of data between the components, in most situations, the producing developer 300, the consuming developer 308, the digital distribution platform 312, the function exchange system 304, and the user device 104 may communicate via a network 320. The network 320 may not be a single network but may encompass local area networks, the proprietary networks of mobile phone providers, and a distributed communications network, such as the internet.

Figure 4:
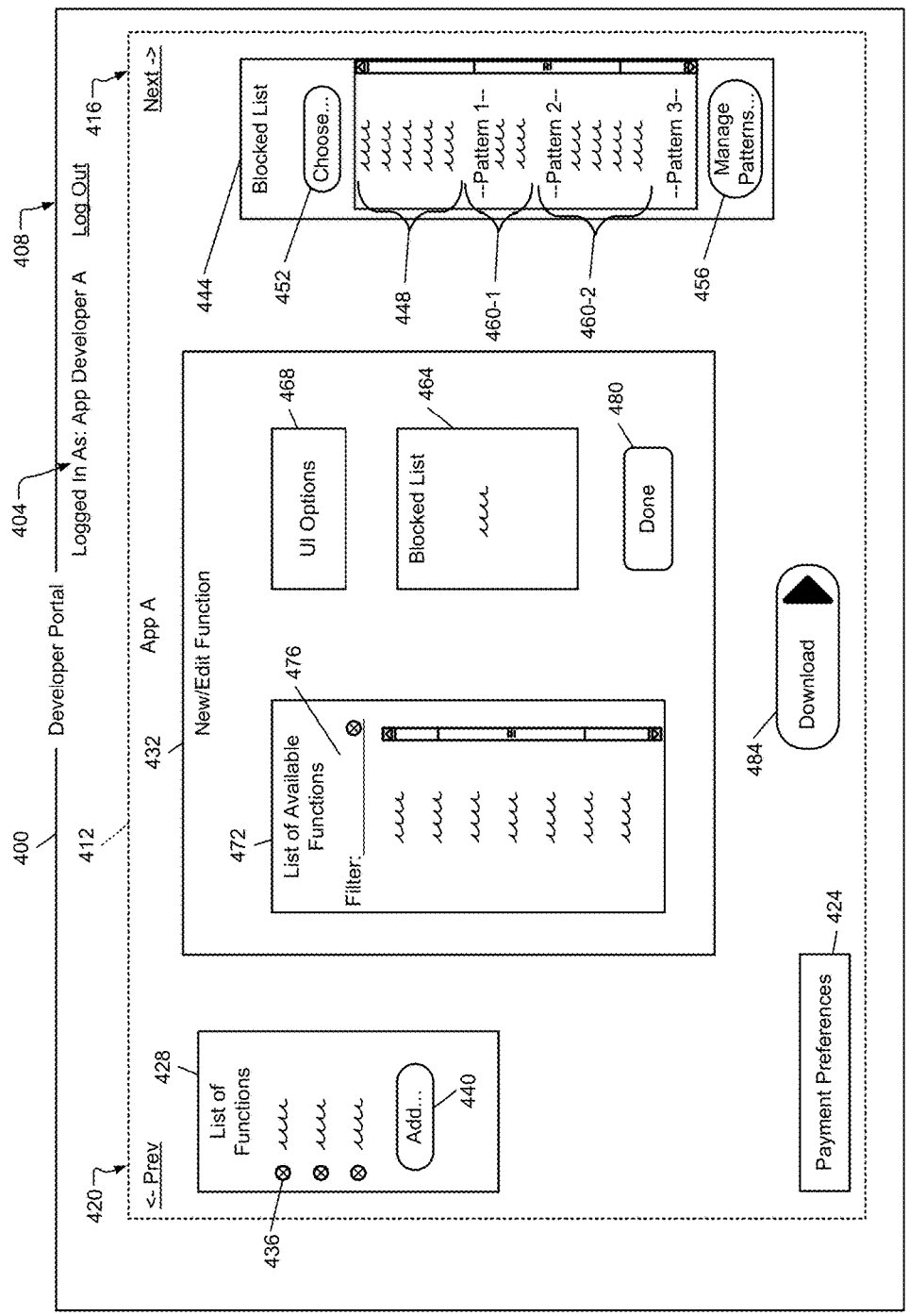
FIG. 4 is a simplified graphic user interface of an example developer portal.

In FIG. 4, a developer portal 400 for the function exchange system 304 is shown. A consuming app developer (referred to as App Developer A) is logged into the developer portal 400 as indicated at 404. App Developer A can log out using user interface element 408. App Developer A may specify settings and choose function modules for a specific app using application interface 412. In this case, the specific app is referred to as App A.

In other implementations, App Developer A may simply review available functions and choose function modules of interest without the developer portal 400 receiving any information about which app a function will be used for. Using the application interface 412, the developer portal 400 can assist App Developer A in tracking which functions have been used for App A specifically.

As a single example, App Developer A can view information for a following app using a "Next" user interface element 416 or previous app using a "Prev" user interface element 420. App Developer A may specify payment preferences using interface element 424. For example, each function module may carry a price, which may be calculated based on number of times the function module is used.

A list 428 displays functions that have been established for App A. Clicking on one of the functions in the list 428 may activate a new/edit function interface 432. An interface element 436, such as an "X", may cause the function to be deleted from the list of functions 428. An "add" user interface element 440 may allow a new function to be selected using the new/edit function interface 432.

A blocked list 444 establishes apps that App Developer A does not want to use as function modules. The blocked list 444 may also identify specific developers to be avoided. A list 448 of explicit apps or app developers may be selected using a "choose" interface element 452. A "manage patterns . . ." user interface element 456 allows App Developer A to specify patterns, such as with wildcards, to identify apps or developers to be avoided.

In FIG. 4, a first pattern 460-1 is shown with two apps or app developers that match the pattern, while a second pattern 460-2 shows four apps or developers that match the pattern. For example only, if app developer A is the SAM'S CLUB WAREHOUSE CENTER discount retailer, one specified pattern may correspond to the COSTCO discount retailer. The Costco pattern may include wildcards before and after "Costco" so that any Costco app is identified and blocked.

In the new/function interface 432, a function-specific blocked list 464 is present. The function-specific blocked list 464 may be arranged similarly to the blocked list 444, allowing App Developer A to identify apps or app developers that should not be supplied in response to a request from App A. Although not shown in FIG. 4, a blocked list, such as the blocked list 444, may be provided for App Developer A globally, which will apply to all apps developed by App Developer A.

A user interface options menu 468 may allow App Developer A to specify display parameters for the function module that will provide the specified function. For example, the options may include a width and height within which a preview of the function module will be shown. The user interface options menu 468 may offer a number of options to allow a graphical output of the function module to match the look and feel of App A, such as font type, font size, colors, etc.

A list of available functions 472 allows App Developer A to identify a function of interest for App A. A filter 476 allows App Developer A to filter the list of available functions based on, for example, keyword searching. One of the functions is selected by the consuming developer. In some implementations, as described above, the consuming developer may select a group of functions or a category of functions, which may correspond to a branch node of the function ontology. In some implementations, the list 472 may be supplemented or replaced by a graphical view of the functional ontology. A tree view such as is shown in FIG. 2 may be shown with each branch collapsed into a single node so that some or all of the function ontology can be seen at once. The user then expands only the branches along the path to the function of interest.

Once a function is selected, a current set of function modules that fulfill that function may be shown to the developer. As described below with respect to FIG. 8, various metadata may be displayed regarding each function module, including screenshots of how a user can interact with the function modules. These screenshots allow the consuming developer to confirm that the selected function corresponds to the need the consuming developer has. Once any desired selections are made in the blocked list 464 and the UI options 468, a user interface element 480 indicates that editing of the new or existing function is complete.

Once all the functions of interest are determined, App Developer A actuates a download UI element 484. Upon actuating the download UI element 484, a customized library may be provided to App Developer A for integration into App A. In various other implementations, a set of API calls corresponding to the list of functions 428 is provided to App Developer A for use with a generic SDK library provided for App Developer A.

The software development kit (SDK) may be downloaded at the same time as an app is being configured or may be downloaded when App Developer A first begins using the developer portal 400. The SDK may integrate with a programming environment of App Developer A, such as an integrated development environment.

The SDK may allow App Developer A to insert one of the functions with a minimum of effort. For example, App Developer A may specify an area of a state where a function should be provided and the SDK provides the dynamic execution code that will identify, download, and execute a function module to provide that function within the specified area.

The settings chosen by App Developer A, either globally, per app, or per function may be captured within App A, such as specific API calls to a library provided by the developer portal 400. Similarly, all of these settings may also be transmitted to the function exchange system 304. When the function exchange system 304 recognizes the app, the developer, or the requested function, the function exchange system 304 may consult the established settings.

Figure 5:
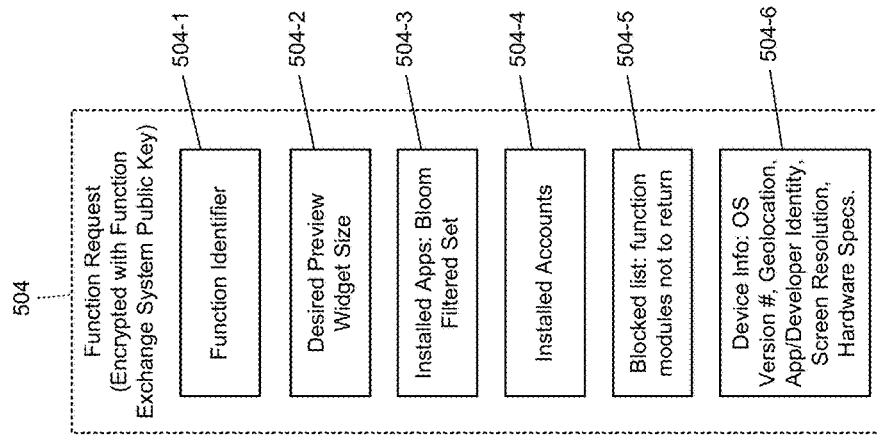
FIG. 5 depicts example contents of an example function request sent to a function exchange system.

In FIG. 5, example contents of a function request 504 may be encrypted with a public key of the function exchange system 304 so that the contents cannot be intercepted by an eavesdropper. A function identifier 504-1 identifies, such as using a pre-arranged code, which function is desired by the transmitting app. A desired preview widget size field 504-2 may specify a width and height of the area reserved for the function module.

At 504-3, a representation of installed apps is provided. For example, an exhaustive listing of all installed apps, including titles and version numbers, may be included. In some implementations, a bit field may be specified for the one-hundred most popular apps. In other words, one hundred binary digits correspond to whether each of those apps is installed, with a zero indicating that the app is not installed and a one indicating that the app is installed. To allow for this shortened bit field format, the set of apps must be pre-arranged. Although one hundred is used as an example, for efficient storage a power of two (such as 128) may be used.

Another mechanism for indicating installed apps using a limited number of bits is a Bloom filter. The Bloom filter specifies whether an app from a predefined set of apps is possibly installed on the device or whether the app is definitely not installed. In other words, to achieve storage compression, the output of a Bloom filter does not definitively state that a certain app is present; the Bloom filter output only definitively states whether certain apps are not present.

An installed accounts data structure 504-4 may report which accounts are present on the user device, and any relevant details about those accounts that might be available. This may impact how relevant a result is. For example, if the user has expressed an interest in streaming a movie, but their account on a particular service does not allow streaming of that movie, the corresponding state may receive a reduced score. The accounts data structure 504-4 may additionally or alternatively report which accounts are active on the user device, and any other available data, such as how recently the account was last accessed.

At 504-5, a blocked list is specified. This blocked list may supplement a blocked list already present in the function exchange system 132 or may be a standalone blocked list. The blocked list may list function modules not to return based on unique identifiers of the function module or app developer, which are known beforehand by the function exchange system 132.

At 504-6, specifications of the device transmitting the function request 504 may include the operating system and the operating system version number. The specifications may also include geolocation data for the device, an identity of the app sending the function request 504, an identity of the app developer of the app, screen resolution, portrait/landscape orientation, and sensor capability (precision of accelerometer, presence of heart rate sensor, etc.).

The app or app developer identities may be used by the function exchange system 132 to apply pre-arranged parameters provided by the developer portal 400, such as a blocked list. The app identity may also be used by the function exchange system 132 to remove functions related to the app itself from the results—in other words, to avoid returning a function module that simply duplicates functionality of a portion of the requesting app. Further, the function exchange system 132 may store a mapping from app identity to desired function, so that the app identity indicates the function of interest. In such a case, the function identifier 504-1 may be omitted.

In FIG. 6A, a first reply 550 is shown, which the function exchange system 304 sends to the dynamic execution module 316. The first reply 550 includes a function module ID 550-1 which specifies a unique ID of the function module selected by the function exchange system 304 to match the function requested by the dynamic execution module 316.

The function module ID 550-1 may also include a version number. The version number allows the dynamic execution module 316 to evaluate whether a newer version of the function module is available. If the dynamic execution module 316 does not have a copy of the function module identified by the function module ID 550-1 or if the version of the function module is out of date, the dynamic execution module 316 requests the function module from the function exchange system 304. This request may simply include a copy of the function module ID 550-1.

In response to the explicit request for a function module, a second reply 560, as shown in FIG. 6B, may be sent. The second reply 560 includes a copy of a function module 560-1 identified by the function module ID 550-1. A cryptographic signature 560-2 may prevent corruption of the function module 560-1 by a man-in-the-middle attack.

In various implementations, a combined reply 570 may be sent by the function exchange system 304 as shown in FIG. 6C. The combined reply 570 may be sent when the function exchange system 304 knows that the function module has not already been sent to the dynamic execution module 316. In other implementations, the combined reply 570 may be sent simply so that download of the function module does not wait for another round of communication between the dynamic execution module 316 and the function exchange system 304.

Figure 7:
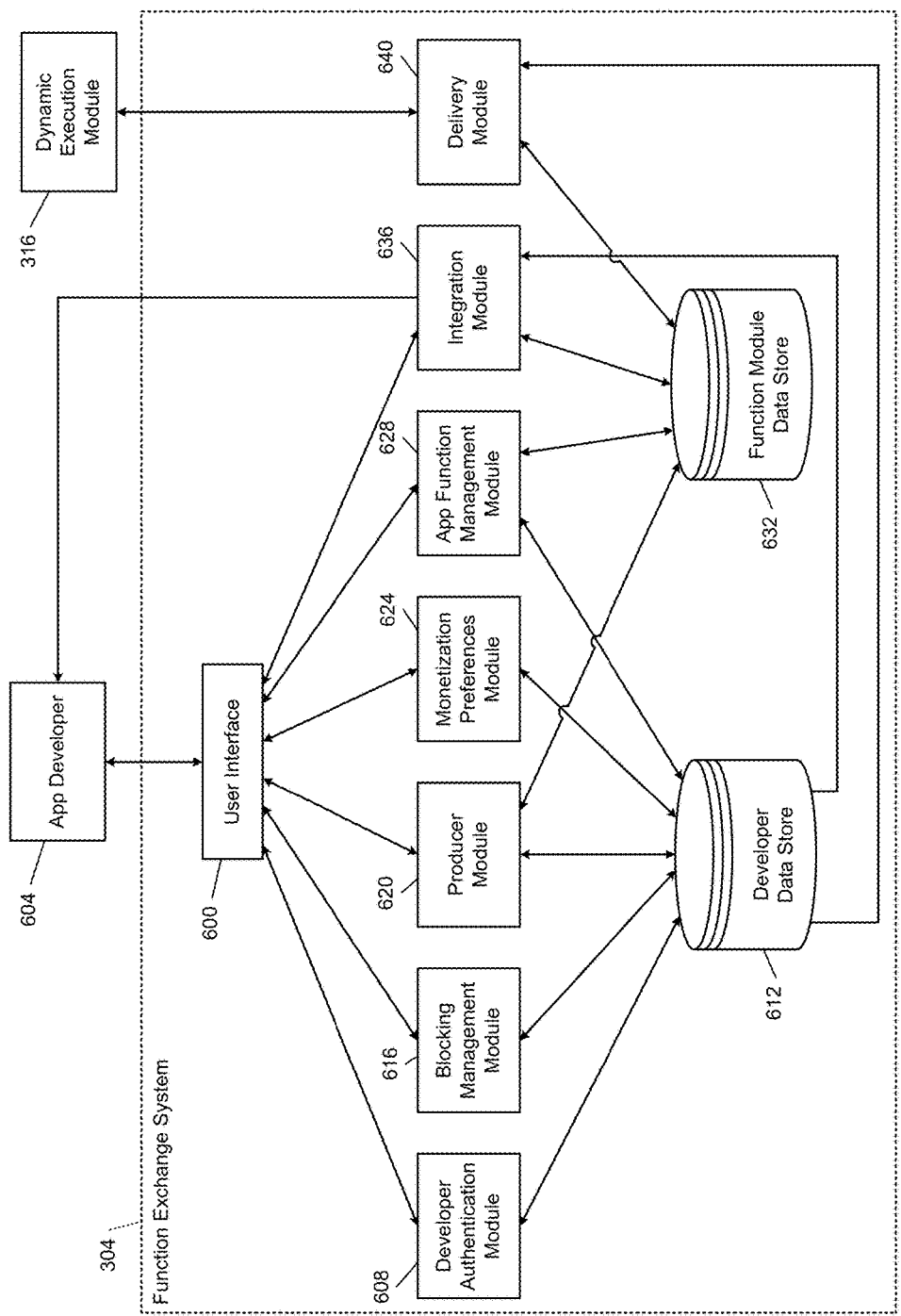
FIG. 7 is a high-level functional block diagram of an example developer portal.

In FIG. 7, an example implementation of the function exchange system 304 is shown as a block diagram. A user interface 600 of the function exchange system 304 allows an app developer 604 (which may be operating in a producing role or in a consuming role) to interact with the function exchange system 304. The user interface 600 may be implemented as a website available over the Internet.

A developer authentication module 608 stores credentials for developers and securely authenticates each developer to the function exchange system 304. The developer authentication module 608 may store credentials in a developer data store 612. Credentials may be stored according to best practices, such as by adding a cryptographic salt value to the credential and using a strong hashing function, such as PBKDF2 (Password-Based Key Derivation Function 2).

A blocking management module 616 allows a developer to formulate patterns that match against function modules or the developers of function modules, where matches should not be provided in response to a function module request. Patterns and explicitly-selected function modules and app developers to block are stored in the developer data store 612, and may have associated metadata indicating whether those apps are blocked for all apps of the developer, for specific apps of the developer, or for specific functions of one or more apps.

A producer module 620 allows a producing developer to provide function modules to the function module data store. The producing developer may provide metadata stored in each function record, including previews, dependencies, etc. The producing developer may track usage of their function modules and update the function modules.

A monetization preferences module 624 stores payment preferences that allow consuming and producing app developers to make payments to the function exchange system 304 and/or to each other, and to receive payments. In various implementations, a consuming app developer may receive compensation for directing traffic to a function module or an app of a producing developer. Further, a producing developer may pay the function exchange system 304 because use of the producing developers function modules may drive increased awareness or engagement with the producing developer.

In addition, advertisements may be shown inside of or adjacent to a user interface displayed by a function module, and revenue related to these advertisements may be shared with the function exchange system and one or both of the producing and consuming developers. In other words, a producing developer may be willing to pay (according to, for example, cost per impression, cost per click, or cost per install) to have their app promoted to the consuming developer and/or to end users using an app of a consuming developer.

An app function management module 628 allows a consuming developer to identify and select one or more functions or function modules based on a function ontology stored in a function module data store 632. In various implementations, the consuming developer can choose functions from the function ontology and, at runtime, function modules matching those functions will be provided to the consuming developer's app.

In other implementations, function module may be provided to the consuming developer during development of the app. In either situation, the function exchange system 304 may allow the app developer to specify the exact function module, which will be either provided to the app developer for integration into the app under development or provided by the function exchange system 304 to the app at run time.

Explicit selection of a function module may be discouraged by the function exchange system 304 because this limits future opportunities to provide improved or more profitable function modules to the consuming developer. An improved function module may provide for a better user experience, be more popular, have better security, or be more recently updated. The app function management module 628 may also track the various apps that each developer is developing in concert with the function exchange system 304, including names and other parameters of each app.

An integration module 636 provides dynamic execution code to the app developer 604. This dynamic execution code may provide a sandbox that allows a function module to be executed within an app developed by the app developer 604. The integration module 636 may tailor the dynamic execution code to preferences stored in the developer data store 612 and may include one or more function modules from the function module data store 632.

The integration module 636 may create API (application programming interface) calls that permit the dynamic execution code to be called by a software routine developed by the app developer 604. These API calls may specify details from the developer data store 612, such as blocked list data, user interface sizing, and identification of desired functions.

The integration module 636 provides the generated code to the app developer 604. The generated code may include source code, object code, libraries, header files, and resources (such as images and fonts). In implementations where the API calls encapsulate all settings specific to the app developer 604, the dynamic execution code may be a static library that is the same across all developers. In this way, the API calls provided to the app developer 604 by the integration module 636 allow the dynamic execution library to request functions using the settings from the app developer 604 while using a standardized library.

A delivery module 640 services requests from the dynamic execution module 316 during runtime of an app developed by the app developer 604. The delivery module 640 may access information from the developer data store 612, such as whether a block list exists and even what function ID the app developer had intended.

In other implementations, the identification of a desired function is received directly from the dynamic execution module 316. The delivery module 640, as explained in more detail below, identifies candidate function modules that will provide the desired function and match any eligibility requirements. For example, some function modules may require a certain operating system or even a certain operating system version. Other function modules may require certain apps to be installed.

The delivery module 640 then ranks the candidate function modules, such as based on popularity, revenue to one or more of the function exchange system 304, consuming app developer and the producing developer, and/or some other metric, such as how recently updated the function module is. The delivery module 640 then provides the highest ranking function module to the dynamic execution module 316.

Figure 8:
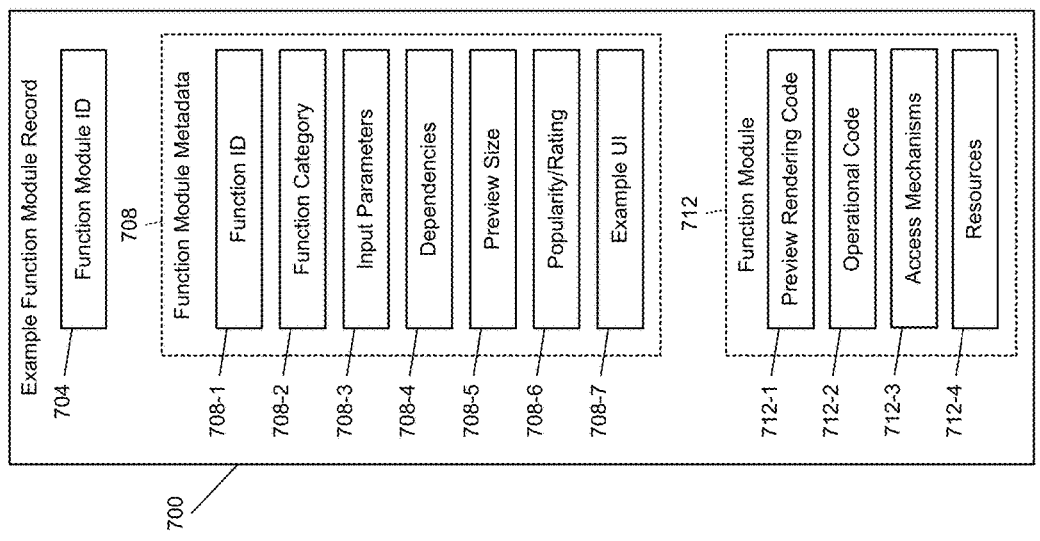
FIG. 8 is a graphical representation of an example function module record format.

In FIG. 8, an example format 700 for function module records stored in the function module data store 632 is shown. A function module ID 704 may uniquely identify the function module within the function module data store 632. Function module metadata 708 includes a function ID 708-1 that may identify the function uniquely within a function ontology. A function category 708-2 may identify the branch node above the function within the function ontology.

Input parameters 708-3 indicates the parameters and types of values that may be provided or required by the function module. For example, a function module that provides mapping services may require a destination located to be inputted and may optionally allow a present location to be inputted.

A dependencies field 708-4 indicates what requirements must be met by the user device in order to run the function module. For example only, the version of the dynamic execution library embedded in the app may be specified, the operating system and acceptable version numbers may be specified. Dependencies 708-4 may also specify which app or apps must be installed on the user device and/or which accounts must be active on the user device.

A preview size field 708-5 indicates a size of either an entire deep view card for the function module or an image portion of the deep view card for the function module. For example, a deep view card may be created by positioning an image generated by the function module adjacent to text generated either by the function module or by the host app. The preview size may be specified in number of pixels and may include a height and a width.

A popularity/rating field 708-6 may specify an all-time popularity of the function module or app from which the function module was developed. In other implementations, popularity may be determined based on a limited timeframe, such as the past month or year. Popularity may also reflect a derivative value of the popularity (such as download velocity—that is, how fast downloads of an app are increasing).

The popularity may also be based on how often the function module is used by a host app. The popularity may also be based on how often the function module is selected by a consuming developer or by the function exchange system 304 for provision to a dynamic execution module. A rating may be based on user feedback of an app or a function module, and may be based on external data sources, such as reviews, blog posts, digital distribution platform ratings, etc.

An example user interface field 708-7 may present one or more screenshots of how a user might interact with the function module. These may be displayed in the developer portal to allow a consuming developer to determine how well the function module will match the consuming developer's goals.

A function module 712 includes preview generating code 712-1 for rendering a deep view card for use in a user interface of a consuming developer's app. The preview may include graphical information that indicates what the function module will provide if selected and may also include independently actionable data. This independently actionable data may allow the user to gain the necessary information from a function module without having to activate the function module or leave the present state of the consuming developer's app.

Operational code 712-2 may implement functionality once the function module is activated. For example, if a function module provides mapping capability, the preview generating code 712-1 may provide a simple preview of a map near a specified location. By actuating the function module, the operational code 712-2 may provide an interactive map that may allow for panning, scrolling, zooming, etc.

Access mechanisms 712-3 may be used instead of the operational code 712-2, or may allow access to additional functionality beyond what is available using the operational code 712-2. When the function module is actuated, one or more of the access mechanisms 712-3 may be used to open another app to a desired state to provide the functionality. Continuing with the mapping example, one of the access mechanisms 712-3 may open the mapping app stored on the user device from the same developer that developed the function module. This mapping app may therefore be specified as a dependency in the dependencies field 708-4. While the operational code 712-2 may allow for an interactive map that allows pan and zoom, one of the access mechanisms 712-3 may be used to reach a mapping app that can display additional information, such as satellite imagery or bike routes.

Resources 712-4 may include elements required for user interface creation, including images, fonts, style sheets, etc.

Figure 9:
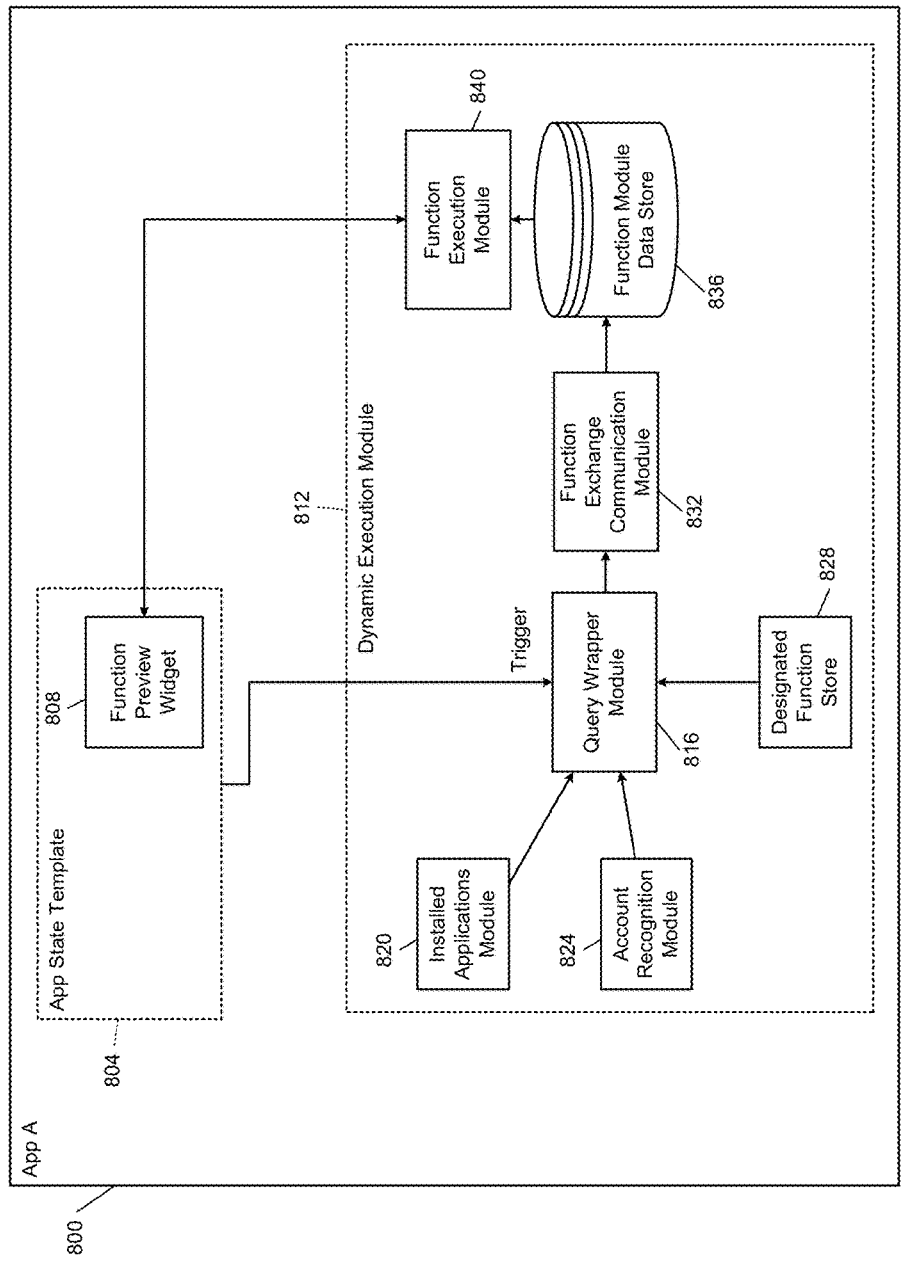
FIG. 9 is a partial block diagram of example dynamic execution code in an application developed according to the principles of the present disclosure.

In FIG. 9, an example of various functional blocks within an example application (App A 800) are shown. App A 800 may include a number of templates for app states. These templates define the contents of each state (sometimes referred to as a screen) of App A 800. One app state template 804 includes a function preview widget 808 in which a preview generated by a function module will be shown.

The app state template 804 may specify that when an app state is instantiated based on the app state template 804, a trigger signal will be sent to a dynamic execution module 812. The dynamic execution module 812 may have been provided by the function exchange system 304 to a developer App A 800 and integrated into App A 800 during development.

The dynamic execution module includes a query wrapper module 816 that formulates a query (or, request) to be sent to the function exchange system 304. The query may be based on an installed applications module 820 that identifies applications installed on the user device and provides a representation of the installed applications to the query wrapper module 816.

An account recognition module 824 identifies active user accounts on the user device. For example, an account with a streaming video operator may indicate that some or all movies from that provider can be streamed as part of the existing subscription service. This may allow function modules corresponding to that streaming video operator to be provided by the function exchange system 304.

A designated function store 828 stores which functions were selected by the app developer for each app state template. The function preview widget 808 corresponds to a function and the designated function store 828 records which function that is. In other implementations, the dynamic execution module 812 may be a preset piece of software, such as a library. In this case, the designated function store 828 may be replaced by parameters in an API call. The app state template 804 may then store these API calls and the trigger message to the query wrapper module 816 will specify the desired function in an API call.

The trigger message and/or the designated function store 828 may also convey to the query wrapper module 816 additional settings (which may alternatively be stored by the function exchange system 304), such as blocked list criteria. The query wrapper module 816 formulates a query such as that shown in FIG. 5.

A function exchange communication module 832 communicates with the function exchange system 304. The function exchange communication module 832 provides the formulated query to the function exchange system 304 and receives in response a function module and/or an indication of the specified function module.

Based on the identity of the function module, the function exchange communication module 832 may then request the full function module to be provided. In other implementations, as described above, the function module may be sent immediately regardless of whether the function module has already been received by the dynamic execution module 812. The function exchange communication module 832 stores received function modules in a function module data store 836.

The function module data store 836 may be implemented as a relational database, such as a lightweight implementation of the MySQL open source database. The database may have a record for each function module retrieved via the function exchange communication module 832. Each record may have fields such as module name, version number, retrieval date, date of last check for updates, whether Internet access is required, etc. Each record may also include a pointer to a file including the function module code. In various implementations, the database schema for the function module data store 836 may be a subset of a schema used by the function module data store 632 of the function exchange system 304.

A function execution module 840 executes the function module corresponding to the function preview widget 808 within the context of App A 800. In other implementations, the function module may be executed within a sandbox within App A 800 or within a sandbox separate from App A 800. The sandbox may be provided by an operating system of the user device or by the dynamic execution module 812 itself.

Execution of the function module provides information, such as text and graphics, which are displayed within the function preview widget 808. When the user actuates (such as by touching or clicking) the function preview widget 808, the executing function module recognizes that additional operation is requested. The executing function module may create a new state or may provide additional user interface elements to the state corresponding to the app state template 804. In other implementations, the executing function module may use an access mechanism to open, or to install and open, an app that provides additional functionality. Upon exiting from the state or the user interface element created by the function module, the state corresponding to the app state template 804 may once again be in the foreground of App A 800.

Figure 10:
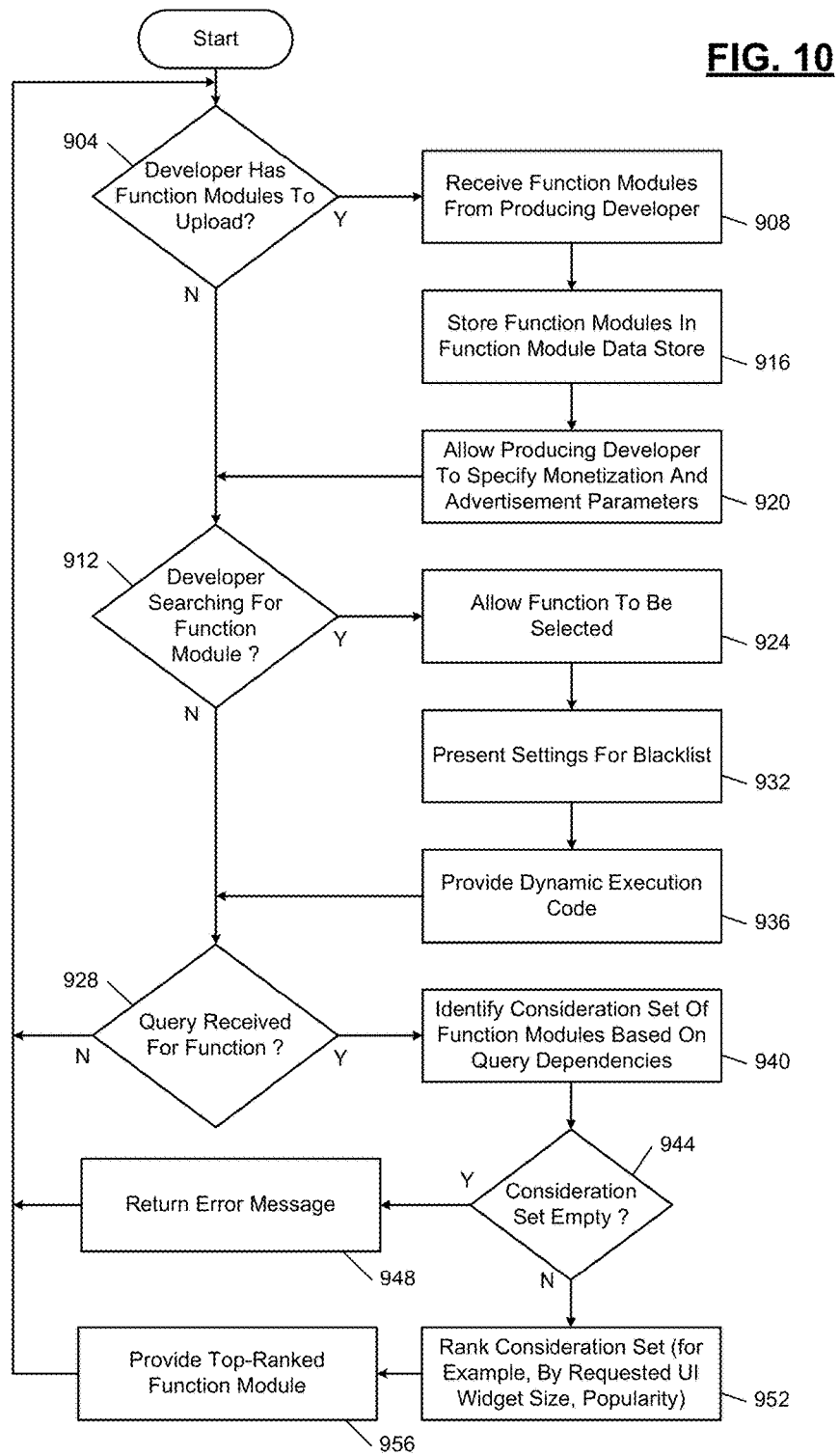
FIG. 10 is a flowchart of example operation of a developer portal.

In FIG. 10, example operation of the function exchange system 304 begins at 904. If a developer authenticated to the function exchange system 304 has function modules to upload (in the developer's role as a producing developer), control transfers to 908; otherwise, control transfers to 912. At 908, control receives the function modules from the producing developer and continues at 916. At 916, control stores the received function modules in the function module data store and continues at 920. At 920, control allows the producing developer to specify monetization and advertisement parameters with respect to each function module. Control then continues at 912.

At 912, if a developer is searching for a function module (in a role as a consuming developer), control transfers to 924; otherwise, control transfers to 928. At 924, control allows a function to be selected, which may be selected from a list or a graphical representation such as a tree. The list or graphical representation may be filtered and/or keyword searched by the developer. At 932, control allows various settings to be prescribed by the developer, such as blocked list settings. Control continues at 936, where dynamic execution code is provided to the consuming developer. Control continues at 928.

At 928, control determines whether a query has been received from a dynamic execution module for a function. If so, control transfers to 940; otherwise, control returns to 904. At 940, control identifies a consideration set of function modules based on dependencies specified by the query. For example, the consideration set will include function modules that match the specified function ID, that execute on the specified operating system and version, and that only require apps that are indicated to be installed by the query. Control continues at 944, where if the consideration set is empty, control transfers to 948; otherwise, control transfers to 952. At 948, control returns an error message to the dynamic execution module. This error message may be displayed to a user by the dynamic execution module, or may be trapped and/or handled by the host app. Control then returns to 904.

At 952, control ranks the consideration set of function modules. As described above, the ranking may include determining a metric for each app based on a weighted sum or average of a variety of factors. The factors may include popularity, requested UI widget size, etc. The ranking then identifies the function module having the highest metric. The consideration set of function modules may be sorted, such as by using a quicksort algorithm, so that the first or the last function module will have the highest metric. Control continues at 956, where the top-ranked function module is selected and sent to the dynamic execution module. Control then returns to 904.

Figure 11:
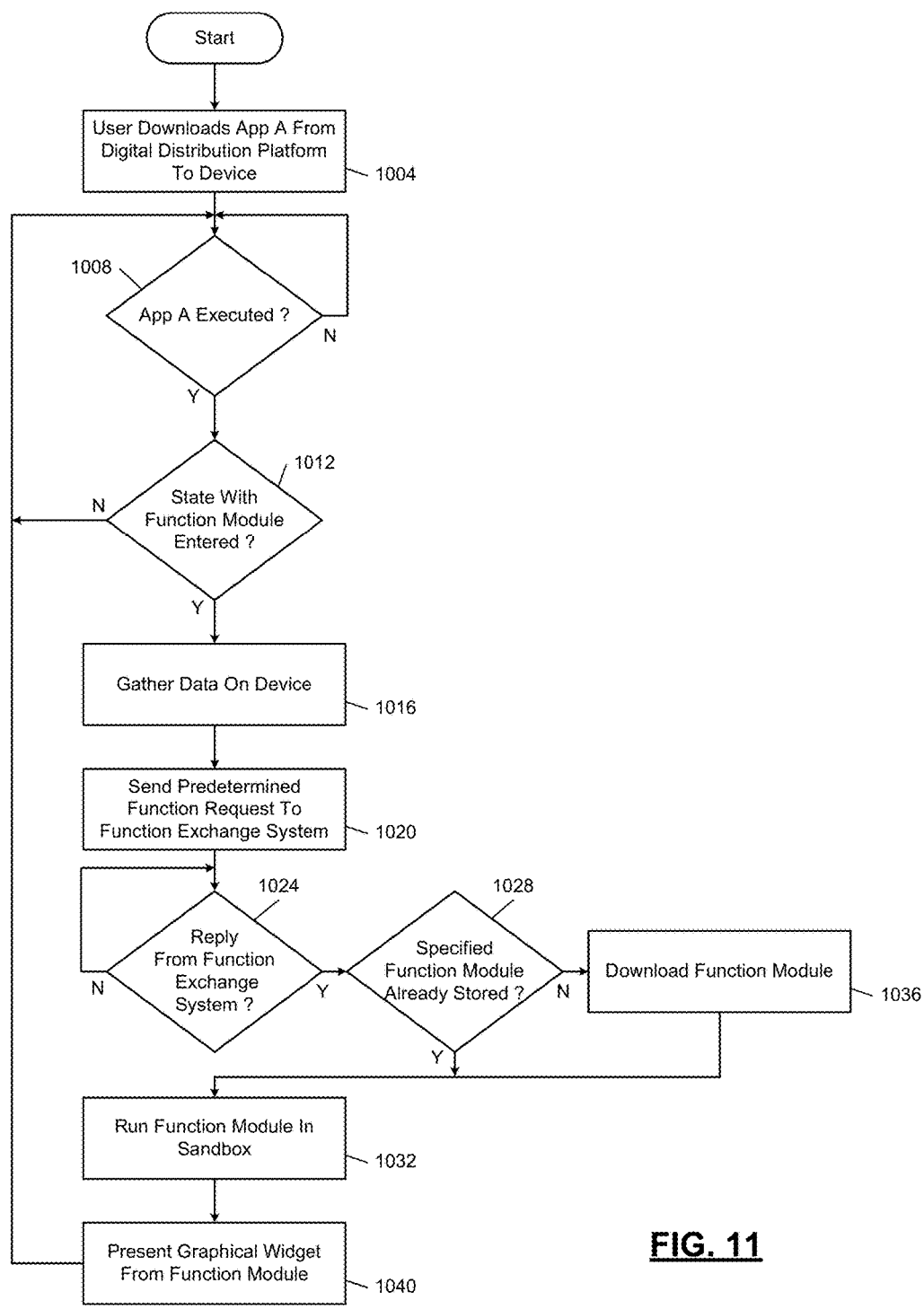
FIG. 11 is a flowchart of example operation of dynamic execution code within an application.

In FIG. 11, example operation of a host app including a dynamic execution module begins at 1004. At 1004, a user downloads an app (referred to as App A) from a digital distribution platform to the user's device. At 1008, if App A is executed, control continues at 1012; otherwise, control remains at 1008. At 1012, control determines whether a state with a function module is entered within App A. If so, control transfers to 1016; otherwise, control returns to 1008.

At 1016, control gathers data on the user device, such as installed applications and active accounts. At 1020, control sends a request including a predetermined function identifier and gathered data, to the function exchange system. At 1024, control waits for a reply from the function exchange system. Once a reply is received, control transfers to 1028; otherwise, control remains at 1024. At 1028, control determines whether the function module specified by the reply is already stored in a local data store. If so, control transfers to 1032; otherwise, control transfers to 1036.

At 1036, control downloads the function module specified in the reply, such as by sending a request to the function exchange system. Control then continues at 1032. At 1032, control runs the function module in the sandbox. At 1040, control presents a graphical widget from the function module to the user within the state. Control then returns to 1008.

Figure 12:
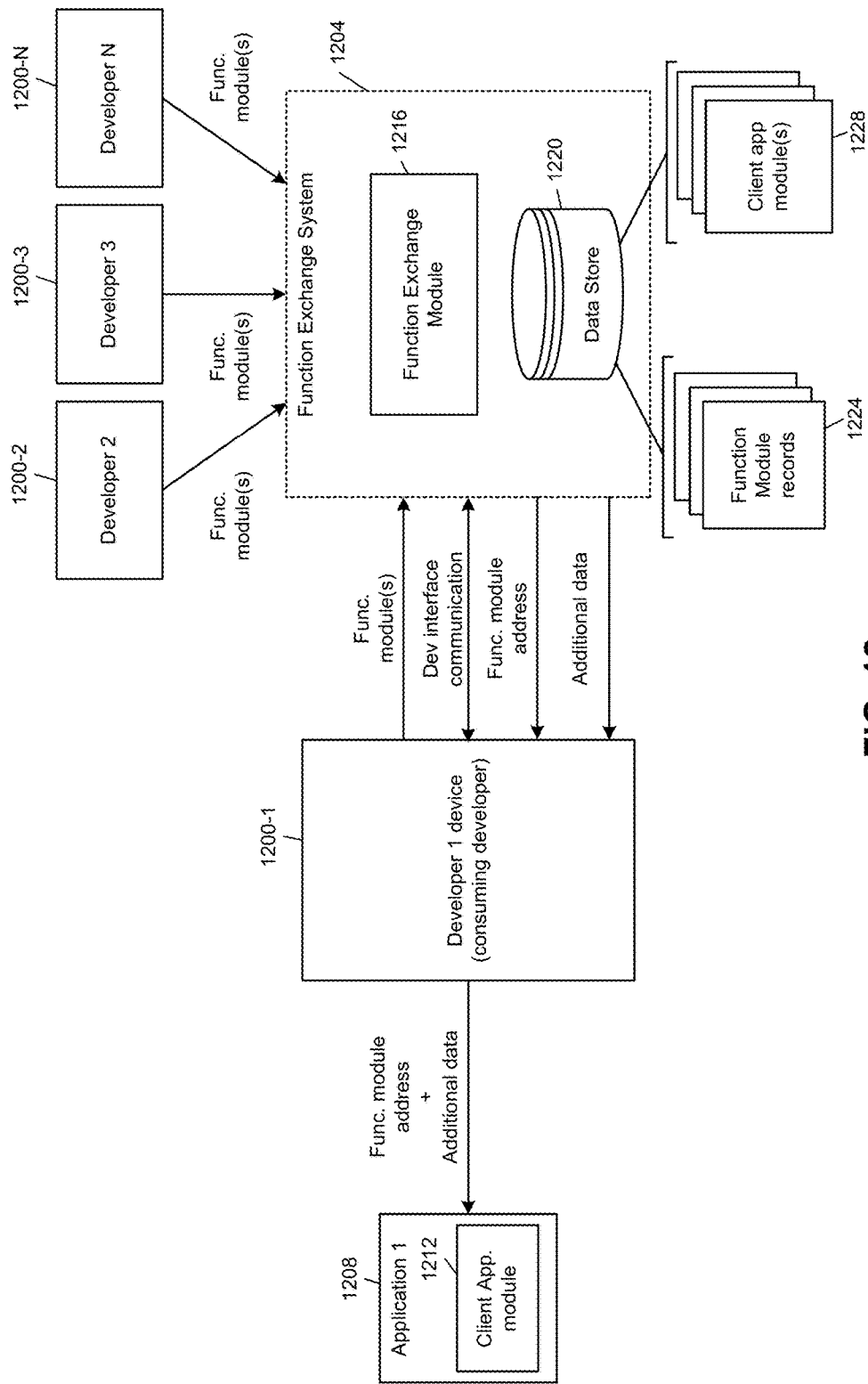
FIG. 12 is a high-level diagram showing interaction between multiple developers and a function exchange system.

FIG. 12 shows interaction between multiple developers 1200-1, 1200-2, 1200-3, . . . 1200-N and a function exchange system. The function exchange system provides in-app functionality to applications that may not otherwise natively provide the in-app functionality. Such in-app functionality can be included in a function module. A function module may be a software module that includes a portion of functionality of the original application with which the function module is associated. The function exchange system can store a plurality of function modules for different applications. A user device (e.g., a smartphone) can retrieve a function module from the function exchange system and execute the function module to provide in-app functionality via a function module GUI, which may be referred to as a "card" in some implementations.

In some implementations, developers of applications may generate the function modules for their applications (e.g., by using a function module creation SDK) and upload the function modules to the function exchange system.

The owner/operator of the function exchange system may use the function exchange system to generate revenue from developers. In some cases, the producing developers may be charged a fee by the function exchange system for uploading the function modules to the function exchange system. Additionally or alternatively, consuming developers may be charged for using the function exchange system. For example, a consuming developer may be charged per use of a function module or charged in another manner (e.g., an up-front fee, recurring fee, etc.). The owner/operator of the function exchange system may receive a portion of whatever fees are paid. Additionally or alternatively, the producing developers may receive a portion of whatever fees are paid.

Consuming developers may use the function exchange system to include function modules in their apps in order to provide new functionality in their apps. In one specific example, a banking application developer may use the function exchange system to include a function module having mapping functionality to the banking application. In this example, a graphical user interface (GUI) implemented by the function module may show the location of different bank branches and/or ATMs on a map. In another example, a restaurant review application developer may use the function exchange system to include a function module having navigation functionality to the restaurant review application. In this example, the navigation functionality may navigate the user to different restaurants identified using the restaurant review application.

In a developer interface, the consuming developer can search for function modules based on functionality (e.g., a text/category search) associated with the function modules. The developer interface can provide the consuming developer with a list of different function modules related to the searched functionality. The consuming developer can then select one of the function modules to be included in the consuming developer's app (e.g., within one or more app states). In some implementations of the function exchange system, the consuming developer can select multiple different function modules for inclusion in the same or different application states.

The consuming developer retrieves a function module address from the function exchange system for accessing (e.g., retrieving) the selected function module. The consuming developer can embed the function module address in the consuming developer's application along with additional code. The additional code may include code that makes a call to the function exchange system requesting a function module. The call may include the function module address as a parameter. The additional code may include code that controls what the user device will do (e.g., code for rendering the function module GUI) upon receiving the function module from the function exchange system. In some cases, some/all of the additional code may be included in a client app module and/or a user-device module. Example digital distribution platforms include, but are not limited to, Google Play developed by Google Inc., the App Store developed by Apple Inc., and Windows Phone Store developed by Microsoft Corporation.

A user downloads the consuming developer's app from the digital distribution platform and then installs the app on a user device. In response to the user opening the state of the app including the function module address (and additional code), the user device accesses a function exchange system 1204 and retrieves the function module for rendering the function module GUI within the app state. The user device may access the function exchange system in response to other conditions other than opening an app state. For example, the user device may access the function exchange system in response to the user interacting with a GUI element. In one example, the GUI element may be an expansion element that expands to display the GUI of a function module upon selection. In a more specific example, a GUI expansion element may be a "Find maps" button that expands upon user selection to show a map GUI generated by a retrieved function module.

FIG. 12 focuses on interaction between developer 1 1200-1 and the function exchange system 1204. In a typical scenario, developer 1 1200-1 may be working on developing application 1 1208. Developer 1 1200-1 may want to add functionality to application 1 1208. For example, developer 1 1200-1 may want to add mapping/navigation functionality to application 1 1208. Developer 1 1200-1 can use the function exchange system 1204 to insert this functionality into application 1 1208.

Developers 1-N 1200-1, . . . 1200-N can upload their function modules to the function exchange system 1204 for use in other developers' apps. In FIG. 12, developer 1 1200-1 has uploaded function modules, which may be optional. Developer 1 1200-1 also interacts with the function exchange system 1204 to select functionality for application 1 1208, as illustrated by "dev interface communication." Developer 1 1200-1 retrieves a function module address for a function module and then inserts the function module address into one or more states of application 1 1208.

Although one function module address is retrieved and inserted into application 1 1208, in some implementations, developer 1 1200-1 may retrieve multiple function module addresses for insertion into application 1 1208. In addition to the function module address, developer 1 1200-1 may retrieve the additional data described above (e.g., code for making calls to the function exchange system and code for rendering the function module GUI). In some implementations, some/all of a client app module 1212 for application 1 1208 may be downloaded by developer 1 1200-1 along with the function module address. In other cases, developer 1 1200-1 can retrieve the client app module and the function module address at different times.

The function exchange system 1204 includes a function exchange module 1216 and a data store 1220. The function exchange module 1216 implements the methods described herein. The data store 1220 stores function module records 1224 and client app modules 1228 used to implement the methods described herein.

Figure 13:
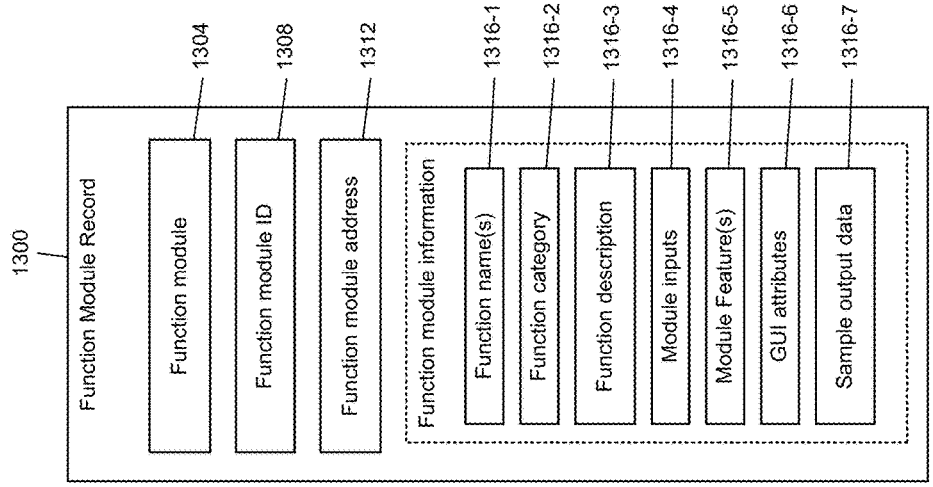
FIG. 13 is a graphical representation of another example format for a function module record.

FIG. 13 shows another example of a function module record 1300. The function module record 1300 is a data structure that may include a function module 1304 and data associated with the function module 1304. A function module ID 1308 may uniquely identify the function module 1304 among the other function modules in the data store 1220. A function module address 1312 indicates the location of the function module 1304 in the function exchange system 1204. The user device may retrieve the function module 1304 using the function module address 1312.

The function module record 1300 may also include a variety of different types of information related to the function module 1304. The function module 1304 may be associated with a function name 1316-1. The function name 1316-1 may describe the function performed by the function module 1304 in a human readable form. In some cases, a single function module can have multiple different names.

For example, a function name may have a number of different synonyms. In other cases, two function modules may be nearly identical, but may be in different languages. In this case, a first function name may be the function name in English, and a second function name may be the name in Spanish. In some cases, some function modules may have multiple names because the function module includes more than one function. For example, a function module may provide both a mapping function and a navigation function.

A function category 1316-2 may define a category (vertical) of the function performed by the function module 1304. Example categories can include a travel category, a hotel category, a movie category, or a ticket category, among others.

A function description 1316-3 may be a human readable description of the function. For example, for a function "show restaurants," the function description may include a description of what the GUI for the function module 1304 shows (e.g., restaurant information, menus, and reviews) and what other functionalities the function module 1304 provides to the user. The description can be viewed by the developer in the developer interface so that the developer can read a quick description of the function.

Module inputs 1316-4 describe values or other data that the function module 1304 may use during operation (e.g., to render the function module GUI in the state). For example, the values may include a user device geolocation, time of day, other locations (e.g., for maps), city name(s), airport code(s), and/or a cuisine name, among other values.

In some implementations, the function module may include a variety of different features 1316-5. The module features 1316-5 describe (e.g., list) various features and capabilities of the function module 1304, such as whether the function module 1304 can "show directions with speech to text capability." For a "show restaurants function," the module features 1316-5 may include whether hours of operation are displayed in the GUI, whether there is outdoor seating indicated in the GUI, whether there are indications of vegetarian/vegan cuisine, or other features.

The features may be in a bullet point format so that the consuming developer can quickly determine the features of the function module in the developer interface. In some implementations, the features may be used as a filter in the developer interface (e.g., see FIGS. 5A-5B). In some implementations, the features may be selected by a consuming developer from a premade set of features. For example, function modules associated with restaurants may include premade sets of restaurant features, such as whether the GUI includes photos of food, menus, reservations, etc. Similar information included in the module features 1316-5 can also be included in and described in the function description field 1316-3.

A GUI attributes field 1316-6 may include information about the GUI rendered for the function module 1304. The GUI attributes 1316-6 may include dimensional information associated with the GUI. For example, the dimensional information may include length and width dimensions (e.g., in pixels) of the GUI. The GUI attributes 1316-6 may also indicate whether the GUI is 2D or 3D. The GUI attributes 1316-6 may also include other attributes that may be specific for the function module. For example, for a mapping function module, the GUI attributes 1316-6 may indicate whether the maps have different views for night and day.

In some implementations, the function module record 1300 may include sample output data 1316-7. The sample output data 1316-7 may be used in the developer interface to provide a preview to the consuming developer. The sample output data 1316-7 may show how the function module GUI will look on the user device. Such a sample output may help the consuming developer select the appropriate function module among potentially ambiguous function names and descriptions.

The data included in the function module record is 1300 not limited to the data described above, but may also include additional data, such as a developer name, a date the function module was submitted to the function exchange system, a popularity of the function module (e.g., a number of times the function module was requested), and other data.

Figure 14:
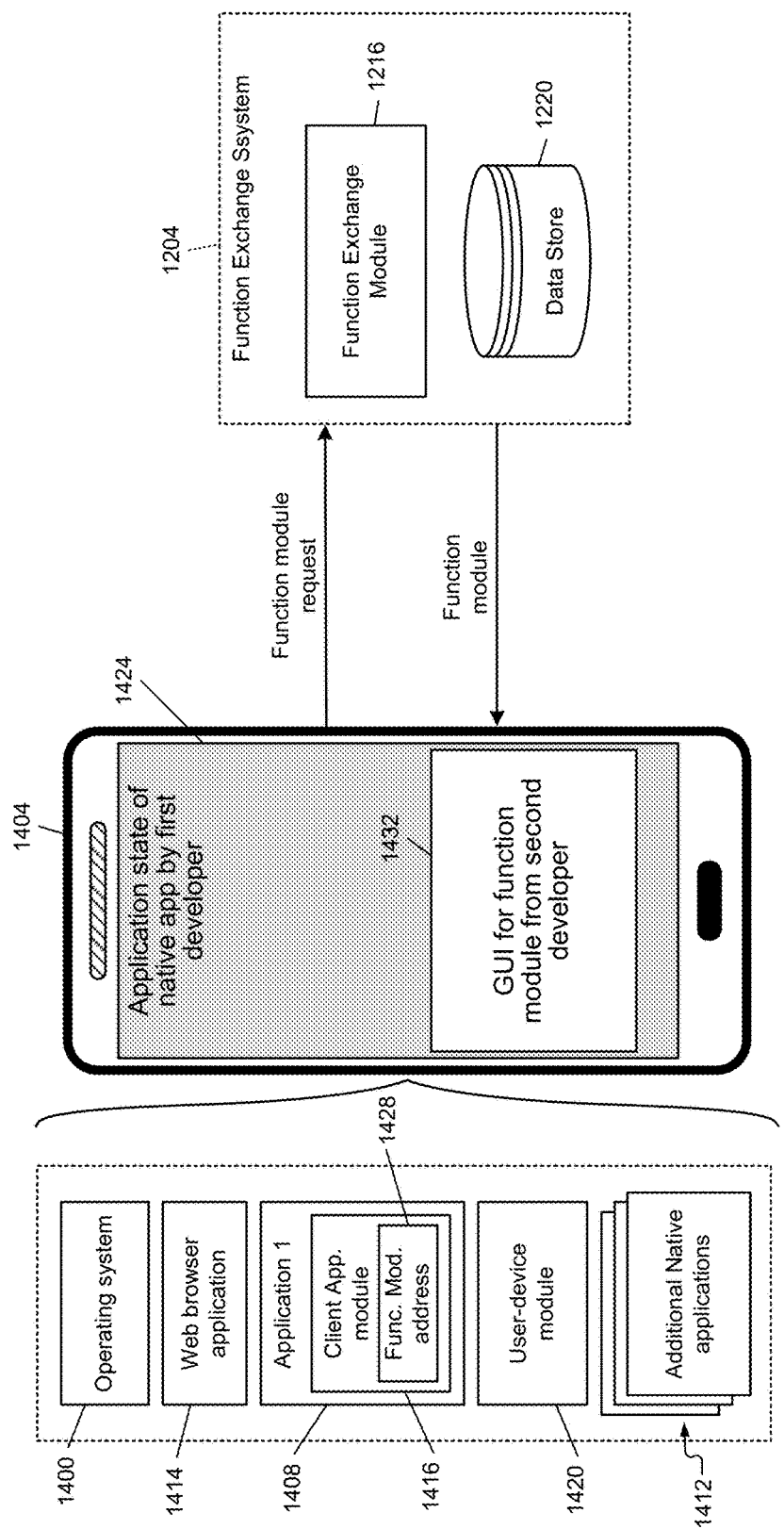
FIG. 14 is a combined functional block diagram and graphical user interface example.

FIG. 14 shows communication between an example user device 1404 and the function exchange system 1204. The user device 1404 includes an operating system 1400 and a plurality of native applications, including application 1 1408 and additional native applications 1412. One particular native application is a web browser application 1414. Application 1 1408 includes a client app module 1416. The user device 1404 also includes a user-device module 1420. The client app module 1416 and the user-device module 1420 may operate to make function module requests to the function exchange system 1204.

The client app module 1416 may represent software provided by the function exchange system 1204 to a developer of the application 1 1408. The developer may have included the client app module 1416 in the application 1 1408 before placing the native application on the digital distribution platform. The user-device module 1420 may represent software that may be provided on the user device 1404 prior to the user purchasing the user device 1404 and/or downloaded and installed on the user device 1404 (e.g., outside of installation of an app). The user-device module 1420 may be referred to as OEM (original equipment manufacturer) software, a platform component, or a framework component in some cases.

Although the client app module 1416 and the user-device module 1420 may both be included on the user device 1404, in other implementations, the features attributed to the user-device module 1420 may be included in the client app module 1416 as part of the application 1 1408. If both the user-device module 1420 and the client app module 1416 are present on the user device 1404, there may be rules in place to prevent conflict of the modules. For example, one of the modules may supersede the other. In one specific example, the client app module 1416 may be more current than the user-device module 1420, and therefore may supersede the user-device module 1420.

In FIG. 14, the user has opened an application state 1424 of the application 1 1408. In response to opening the application state 1424, at least one of the client app module 1416 and the user-device module 1420 generate a function module request to the function exchange system 1204 that may include a function module address 1428 and additional data, such as data indicating the type of the user device 1404 (e.g., manufacturer, model, size, screen resolution, etc.), the platform (e.g., operating system, version of app, app name) of the user device 1404, and geolocation of the user device 1404. The function exchange system 1204 returns a function module to the user device 1404 in response to the function module request. The user device 1404 then executes the function module and displays a resulting graphical user interface at 1432.

In some implementations, the application 1 1408 and the client app module 1416 can be configured to request the function module from the function exchange system 1204 each time the application state 1424 is opened. In other implementations, the function module may be stored on the user device 1404 after first receipt of the function module.

Although a single application includes a client app module in FIG. 14, in some cases multiple applications may include client app modules. In some implementations, the same client app module can be included in multiple different applications. In other implementations, different client app modules, which may be app-specific, may be included in different applications. Although a single function module address is illustrated in FIG. 14, multiple function module addresses (e.g., the same or different function module addresses) may be included in a client app module.

Figure 15:
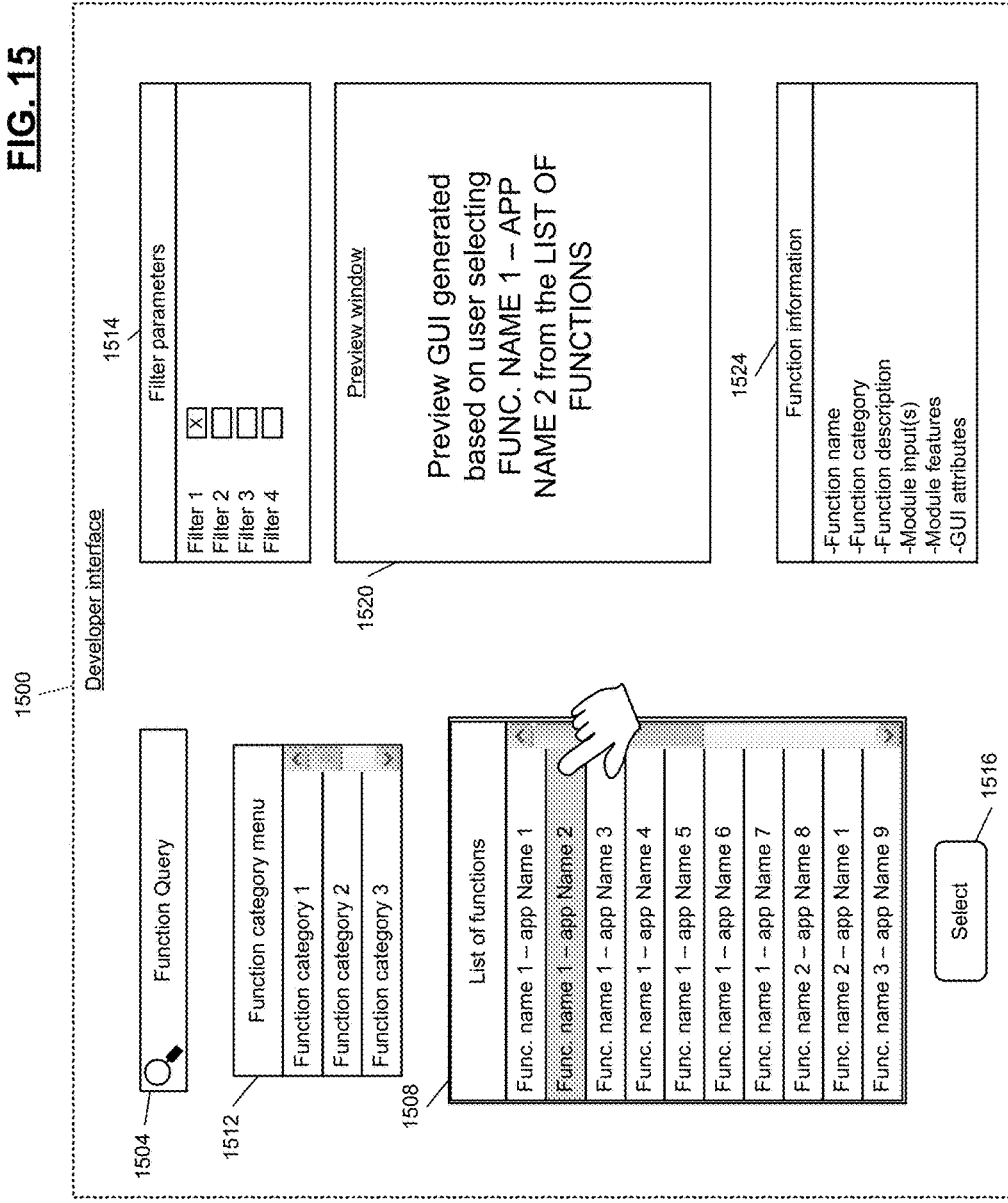
FIG. 15 is a graphical user interface of an example function exchange system developer interface.
Figure 16:
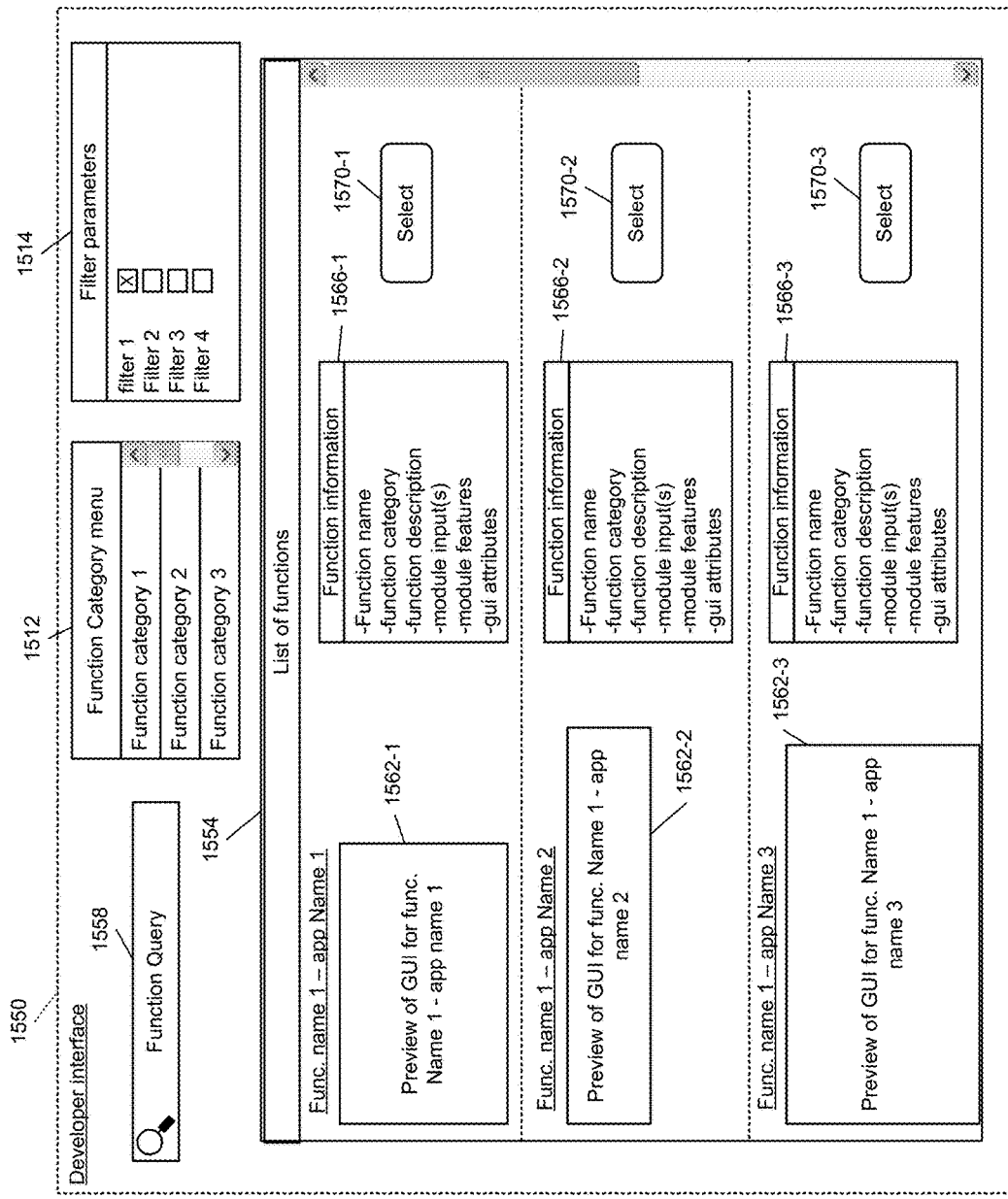
FIG. 16 is a graphical user interface of another developer interface for a function exchange system.

FIGS. 15-16 show example developer interfaces. A developer, referred to as a consuming developer, can search for function modules for insertion into their application. The developer can search for functions (e.g., text search for function names and descriptions) associated with the function modules. The developer may also search by function category. The developer may filter the results based on a variety of different filter parameters, such as module input(s), module features, and GUI attributes (e.g., 2D/3D and/or dimensions).

In a developer interface 1500 of FIG. 15, a query 1504 can be performed, and search results 1508 are listed by function name and app name. Note that the same function name can be applied to different function modules. In this case, the app names can be used by the consuming developer to differentiate between the function modules. The developer may narrow the resulting list of functions based on a category menu 1512, or may even omit the query altogether and simply look at all function modules in a particular category.

In addition, the developer can filter the list 1508 based on various criteria. For example, in a list of individually-selectable filters 1514, one filter may show only function modules that allow for interactivity. Another filter may show only function modules that do not require network connectivity. Another filter may show only function modules that have their own operational code and do not simply deep link out to another app or website.

When a function module is selected, such as by using a select interface element 1516, a preview 1520 of the GUI of the function module is shown to indicate how it may appear when embedded in an app. Further function information is displayed at 1524.

In FIG. 16, a developer interface 1550 displays a list of functions 1554, which may have resulted from a query 1558, in a format that includes a preview 1562 and function information 1566 for each element. The consuming developer can select a function module by pressing the respective select button 1570.

Although not illustrated in FIGS. 15-16, the developer interface GUI may also include fields that show the available platforms (e.g., devices or operating systems) for the function module and/or platform-specific previews for the different platforms since the platforms may implement the functions differently. In some cases, the search results may include different function module GUIs for the same function-app combination. For example, a producing developer may provide multiple different GUI formats for the same function. The developer interface may also include other information for a function module. For example, the developer interface may include terms and conditions for embedding the function module, along with costs associated with embedding the function module.

Figure 17:
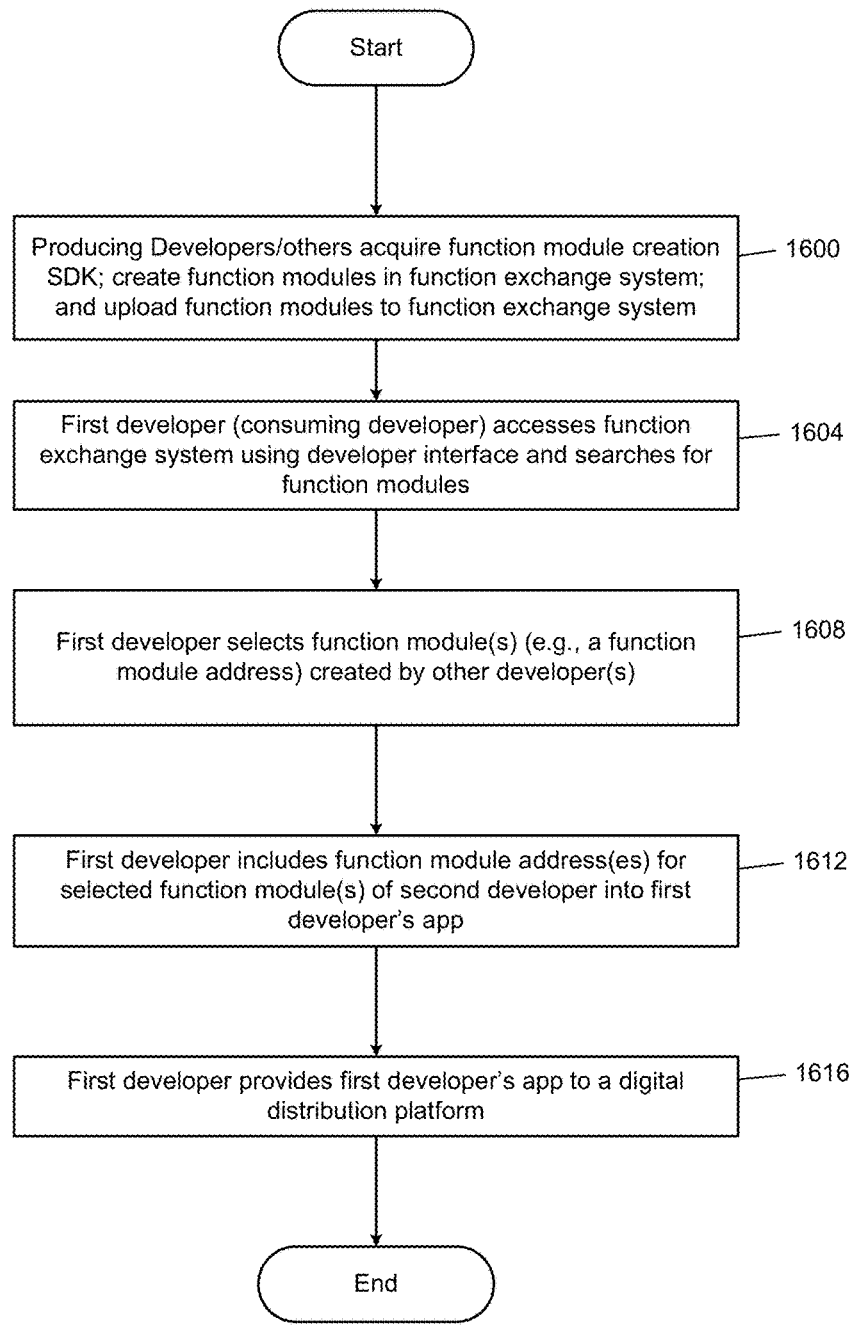
FIG. 17 is a flowchart of example interaction between developers and a function exchange system.

FIG. 17 shows an example method describing interaction between developers and the function exchange system. Initially, at 1600, one or more producing developers (or other parties) acquire function module creation SDKs for creating function modules. The function module creation SDKs may be used by producing developers to create function modules from their applications. The producing developers may then create function modules using the function module creation SDKs and upload the created function modules to the function exchange system.

At 1604, a first developer (consuming developer) can then access the function exchange system and search for function modules to add to their application (e.g., one or more states of the app). At 1608, the first developer (consuming developer) then selects a function module generated by a second application developer (producing developer). At 1612, the first developer includes the function module address (and other code) for the selected function module into the first developer's app. At 1616, the first developer then provides the app to a digital distribution platform for download by users.

Figure 18:
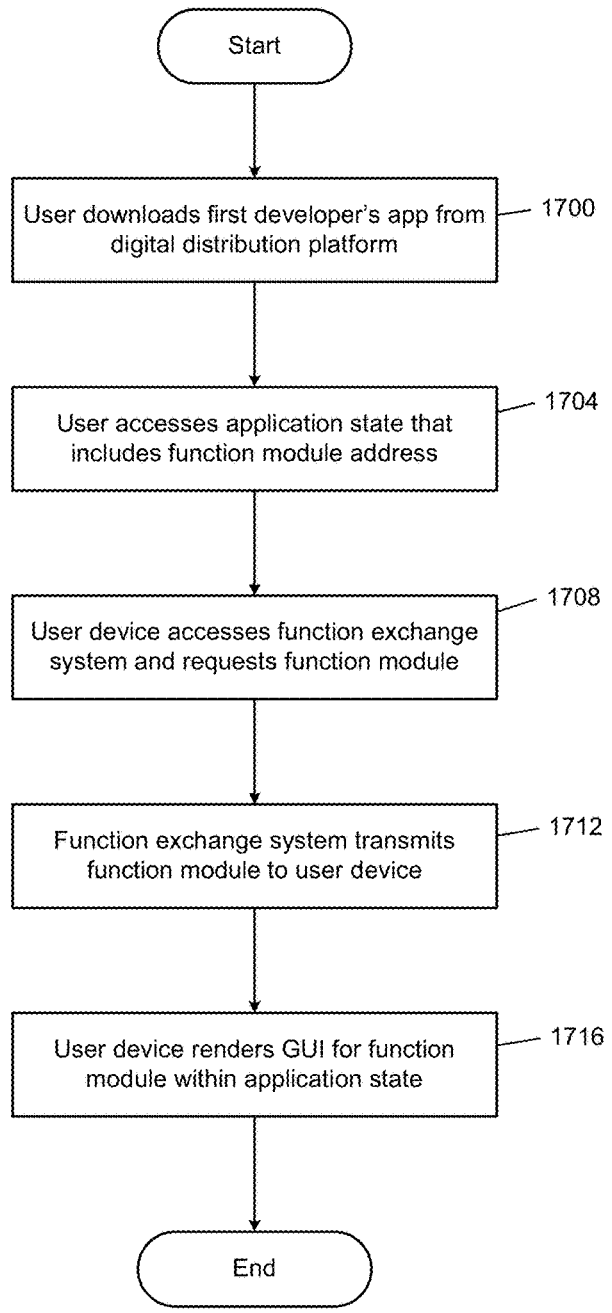
FIG. 18 is a flowchart of example interaction between a user device and a function exchange system.

Referring to FIG. 18, initially at 1700, a user downloads the first developer's application to the user device. During operation of the application, at 1704, the user accesses an application state including the function module address. In response to accessing the state, at 1708 the user device accesses the function exchange system using a function module request. In response to the request, the function exchange system transmits a function module to the user device at 1712. At 1716, the user device then renders a GUI for the function module in the accessed application state.

The user device can execute a received function module to provide a wide variety of functionality and the function module may include a variety of data. The user device can perform operations based on the data included in the received function module. For example, the user device can render GUIs, retrieve information, and transmit information based on data included in the receive function module.

A function module can include data (e.g., text, images, and instructions) that is used by the user device (e.g., a client app module) to generate a function module GUI (FMGUI). The user device may generate an FMGUI based on data included in the function module.

In some examples, the user device may generate an FMGUI based only on the data included in the function module. In other examples, the user device may retrieve data stored on the user device in addition to data included in the function module in order to generate an FMGUI. In still other examples, the user device may retrieve data from a remote device (e.g., a remote server) in addition to data included in the function module in order to generate an FMGUI.

In some implementations, the function module may include text data. The text data can include any text to be included in an FMGUI. For example, the text data can include, but is not limited to, a title of an application, a description of an application, a description of an application function, and additional text. In some implementations, the function module may include image data. The image data can include any images to be included in an FMGUI. For example, the image data can include, but is not limited to, an application icon that represents the application, user interface images used for rendering the FMGUI, such as screenshots or images for user-input elements (e.g., button images, menu images, slider images, etc.). Image data may also include animations and videos.

In some implementations, the function module may include one or more access mechanisms. For example, the function module may include one or more application access mechanisms (links to native application states), one or more web access mechanisms (e.g., web links such as URLs), and one or more application download addresses (e.g., links to download applications on digital distribution platforms). The access mechanisms may be associated with one or more links included in the FMGUI. In some examples described herein, the function module may include data for generating access mechanisms automatically (e.g., based on GPS changes or other data) or in response to user input.

In some implementations, a function module may include data for generating GUI elements that display information to the user and receive user input (e.g., touches, clicks, speech). The user device can generate user interface elements that display information and receive user input based on the data in the function module.

Various user interface elements may include, but are not limited to: 1) pop-out windows that are presented into the foreground, leaving the previous interface in the background such that the pop-out is overlaying the background (e.g., a dialog box that provides a message and requests further input), 2) a text box in which the user can enter text information, 3) a menu (e.g., a menu/submenu bar) that allows the user to select from a list of choices, 4) a button element (e.g., a push-button) that the user can select (e.g., tap), 5) a link (e.g., a hyperlink) including text that indicates an action that may be taken by the user device in response to user selection of the link, 6) a list of items (e.g., a list box or drop-down list), 7) a grid view of information that presents data in a tabular format (e.g., a spreadsheet), 8) check boxes, 9) radio buttons, 10) a slider bar, 11) a tab that the user can select to navigate between multiple different GUIs of the FMGUI, 12) a calendar for inputting dates, and 13) expand/collapse buttons (and anchors for dragging) for modifying the size and available functionality of an FMGUI.

In some implementations, the function module may include instructions that define behavior (e.g., automatic behavior or response to user input) of the FMGUI. The instructions may define operations for the user device to perform. For example, the instructions may define the layout of the FMGUI, such as markup language defining the layout of the text, images, and user input elements. The instructions may also define operations for the user device (e.g., native app, OS, etc.) to perform. The operations defined by the instructions may be automatically performed by the user device in some examples. For example, the user device may automatically retrieve references to data (e.g., stored on the user device or on a remote server on the Internet).

The instructions may also define operations for the user device to perform in response to user input. For example, the instructions may define operations for the user device to perform in response to user interaction (e.g., touching) with any of the user interface elements described herein. The instructions may also support computations (e.g., calculations and graphing). In some implementations, the instructions may define how to generate one or more access mechanisms in response to user selection of a tap target.

In some implementations, the function module may include references to data for the user device to retrieve for inclusion into the FMGUI. The references may be references to data included on the user device. For example, one or more references may be to calendar information on the user device (e.g., a user's appointments so the FMGUI can display conflicts with the user's schedule). As another example, one or more references may be to contact information on the user device, including, but not limited to, addresses, phone numbers, photos (e.g., contact photos), text messages, emails, etc.

The references may also be references to data included on computing devices other than the user device. For example, the function modules may include references to data on remote servers, such as servers included in the function exchange system and/or third party servers. Third party servers may include servers for native/web applications (e.g., native applications for the user device), for example. The references may be to text, images, or other information stored on servers or generated in real time in response to requests for information from the user device. Examples are cab locations, reservation times for restaurants, ticket availability, etc.

In some implementations, the function module may include advertisement data that is sponsored. For example, an FMGUI may include a sponsored advertisement for goods or services from the producing developer or for third party good or services.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. §112(f) unless an element is expressly recited using the phrase "means for" or, in the case of a method claim, using the phrases "operation for" or "step for."

What is claimed is:

1. A method of developing a first application, the method comprising:
    accessing a graphical user interface of a developer exchange system;
    using the graphical user interface of the developer exchange system, selecting a first function from a plurality of functions in a function ontology;
    receiving, from the developer exchange system, processor-executable instructions for integration into the first application, wherein, when the first application is downloaded to and executed on a user device, the processor-executable instructions perform (i) sending a function module request from the user device to the developer exchange system, (ii) receiving a function module provided by the developer exchange system at the user device, (iii) executing the provided function module on the user device, and (iv) on the user device, presenting display data from the provided function module within the first application, wherein the function module request identifies the first function;
    integrating the processor-executable instructions into the first application, including designating an area in which to display the display data to a user; and
    integrating the display data into a first state template, including reserving the area in the first state template for display of the display data from the function module,
    wherein in response to the first application instantiating a state from the first state template, the function module is invoked and the display data generated by the function module is displayed in the reserved area, and
    wherein the processor-executable instructions include:
        in response to instantiation of the state from the first state template, sending the function module request to the developer exchange system;
        storing the provided function module provided by the developer exchange system;
        sending another function module request to the developer exchange system each time a state is instantiated from the first state template; and
        in response to a subsequent function module request with respect to the first state template causing the developer exchange system to provide a different, second function module, purging the provided function module from storage.

2. The method of claim 1, wherein the processor-executable instructions include storing received function modules in a function module data store.

3. The method of claim 2, wherein the processor-executable instructions include:
    receiving a function module identifier from the developer exchange system in response to the function module request; and
    only in response to the received function module identifier not matching a function module identifier stored in the function module data store, sending a request to the developer exchange system for provision of a function module identified by the received function module identifier.

4. The method of claim 1, wherein the processor-executable instructions include executing the provided function module in a sandbox.

5. The method of claim 1, wherein the processor-executable instructions include, on startup of the first application, sending the function module request to the developer exchange system.

6. The method of claim 5, wherein the processor-executable instructions include, on only a first startup of the first application on the user device, sending the function module request to the developer exchange system.

7. The method of claim 1 further comprising:
    receiving, from the developer exchange system, an identification of the first function; and
    creating an application programming interface call within code associated with the first state template, wherein the application programming interface call includes the identification of the first function.

8. The method of claim 7 further comprising:
    receiving a software development kit from the developer exchange system, wherein the software development kit provides a template for creating the application programming interface call, and wherein creating the application programming interface call includes populating the template with the identification of the first function.

9. The method of claim 1, wherein the processor-executable instructions include:
identifying applications installed on the user device;
identifying active accounts on the user device; and
preparing the function module request by including data related to the active accounts and data related to the identified applications.

10. The method of claim 1 further comprising:
creating a first function module having a proper subset of functionality of the first application; and
providing the first function module to the developer exchange system.

11. The method of claim 10 further comprising, in response to updating code of the first application related to the proper subset of functionality, an updated version of the first function module to the developer exchange system.

12. The method of claim 10 further comprising providing metadata regarding the first function module to the developer exchange system, wherein the metadata includes at least one of (i) a preview of a user interface of the first function module and (ii) a text description of the first function module.

13. A non-transitory computer-readable medium storing processor-executable instructions, the instructions comprising:
upon execution of a first application on a user device, transmitting a function module request from the user device to a developer exchange system over a network connection, wherein the first application incorporates the instructions and wherein the function module request identifies a specific function to be performed;
receiving a first function module from the developer exchange system at the user device, wherein the first function module includes code configured to generate display data on the user device related to the specific function to be performed;
storing the first function module in a function module data store;
in response to a triggering event, retrieving the first function module from the function module data store and executing the first function module on the user device;
presenting display data on the user device generated by execution of the first function module,
wherein:
the display data is incorporated into a first state template of the first application from which states are instantiated,
the triggering event is based on a first state being instantiated from the first state template, and
the function module request is transmitted in response to the first state being instantiated from the first state template;
transmitting a subsequent function module request to the developer exchange system each time a state is instantiated from the first state template; and
in response to receiving a different, second function module from the developer exchange system according to the subsequent function module request, purging the stored first function module from the function module data store.

14. The non-transitory computer-readable medium of claim 13, wherein the first function module is executed in a sandbox.

15. The non-transitory computer-readable medium of claim 13, wherein:
the display data is displayed within the first state of the first application; and
the triggering event includes the first state of the first application being accessed by a user of the first application.

16. The non-transitory computer-readable medium of claim 13, wherein the instructions include:
receiving a function module identifier from the developer exchange system in response to the function module request; and
only in response to the received function module identifier not matching a function module identifier stored in the function module data store, sending a request to the developer exchange system for provision of the first function module.

17. The non-transitory computer-readable medium of claim 13, wherein the instructions include:
identifying applications installed on the user device;
identifying active accounts on the user device; and
preparing the function module request by including data related to the active accounts and data related to the identified applications.

18. A computing device comprising:
a non-transitory computer-readable medium storing instructions; and
processing hardware that executes the instructions from the non-transitory computer-readable medium, wherein the instructions include:
upon execution of a first application on a computing device, transmitting a function module request from the computing device to a developer exchange system over a network connection, wherein the first application incorporates the instructions and wherein the function module request identifies a specific function to be performed;
receiving a first function module from the developer exchange system at the computing device, wherein the first function module includes code configured to generate display data on the computing device related to the specific function to be performed;
storing the first function module in a function module data store;
in response to a triggering event, retrieving the first function module from the function module data store and executing the first function module on the computing device;
presenting display data on the computing device generated by execution of the first function module,
wherein:
the display data is incorporated into a first state template of the first application from which states are instantiated,
the triggering event is based on a first state being instantiated from the first state template, and
the function module request is transmitted in response to the first state being instantiated from the first state template;
transmitting a subsequent function module request to the developer exchange system each time a state is instantiated from the first state template; and
in response to receiving a different, second function module from the developer exchange system according to the subsequent function module request, purging the stored first function module from the function module data store.

19. The computing device of claim 18, wherein the computing device is a smartphone.

* * * * *